US012670687B2

(12) United States Patent (10) Patent No.: US 12,670,687 B2
Uzawa et al. (45) Date of Patent: Jun. 30, 2026

(54) OBJECT DETECTING DEVICE AND METHOD

(71) Applicant: NTT, Inc., Tokyo (JP)

(72) Inventors: Hiroyuki Uzawa, Tokyo (JP); Ken Nakamura, Tokyo (JP); Saki Hatta, Tokyo (JP); Shuhei Yoshida, Tokyo (JP); Daisuke Kobayashi, Tokyo (JP); Yuya Omori, Tokyo (JP); Koyo Nitta, Tokyo (JP)

(73) Assignee: NTT, INC., Tokyo (JP)

( * ) Notice: Subject to any disclaimer, the term of this patent is extended or adjusted under 35 U.S.C. 154(b) by 244 days.

(21) Appl. No.: 18/567,609

(22) PCT Filed: Jun. 7, 2021

(86) PCT No.: PCT/JP2021/021541
§ 371 (c)(1),
(2) Date: Dec. 6, 2023

(87) PCT Pub. No.: WO2022/259299
PCT Pub. Date: Dec. 15, 2022

(65) Prior Publication Data
US 2024/0296648 A1 Sep. 5, 2024

(51) Int. Cl.
*G06V 10/26* (2022.01)
*G06V 10/34* (2022.01)
*G06V 10/776* (2022.01)
(52) U.S. Cl.
CPC .............. *G06V 10/26* (2022.01); *G06V 10/34* (2022.01); *G06V 10/776* (2022.01)
(58) Field of Classification Search
CPC ...... G06V 10/26; G06V 10/34; G06V 10/776; G06V 10/759; G06V 10/809; G06V 10/82
See application file for complete search history.

(56) References Cited

U.S. PATENT DOCUMENTS

2004/0047494 A1* 3/2004 Lee ..................... G06V 40/161
382/165
2014/0125781 A1* 5/2014 Hirai ................... H04N 13/366
348/51
(Continued)

FOREIGN PATENT DOCUMENTS

JP 2014092997 A 5/2014
WO 2018180386 A1 10/2018

OTHER PUBLICATIONS

Stahl et al, Divide and Count: Generic Object Counting by Image Divisions, 2018, IEEE Transactions on Image Processing, 28(2): 1035-1044. (Year: 2018).*

(Continued)

*Primary Examiner* — Kathleen M Broughton
(74) *Attorney, Agent, or Firm* — Slater Matsil, LLP

(57) ABSTRACT

An object detecting device includes: an overall processing unit configured to perform object detection processing on an input image; an allocation processing unit configured to determine a segmented image for each frame which is subject to object detection among the plurality of segmented images in advance in a cycle of N frames, and reserve the determined segmented image; a selection processing unit configured to select and output, for each frame, some of the segmented images that are subject to object detection among the plurality of segmented images based on a reservation result from the allocation processing unit; a division processing unit configured to perform object detection processing on each of the segmented images output from the selection processing unit; and a synthesizing processing unit configured to synthesize an object detection result from the overall processing unit and an object detection result from the division processing unit.

11 Claims, 17 Drawing Sheets

(56) References Cited

U.S. PATENT DOCUMENTS

| | | | | |
|---|---|---|---|---|
| 2018/0308242 A1* | 10/2018 | Honjo | .................... | G06T 7/251 |
| 2018/0330481 A1* | 11/2018 | Watanabe | ................ | G06T 7/00 |
| 2019/0164010 A1* | 5/2019 | Ma | ........................ | G06F 18/254 |
| 2024/0370694 A1* | 11/2024 | Hatta | ....................... | G06N 3/04 |

OTHER PUBLICATIONS

Redmon et al., "YOLOv3: An Incremental Improvement," University of Washington, arXiv:1804.02767v1 [cs.CV], Apr. 8, 2018, 6 pages. As discussed in the specification.

Ujiie et al., "Load Mitigation of CNN-Based Object Detection Utilizing Motion Vectors in Video Codecs," IPSJ SIG Technical Report, IPSJ SIG Technical Report, vol. 2018-CVIM-210, No. 4, Jan. 18, 2018, 8 pages. As discussed in the specification.

Ruzicka, et al., "Fast and accurate object detection in high resolution 4K and 8K video using GPUs," ResearchGate, Article, Sep. 2018, 8 pages. As discussed in the specification.

Liu et al., "SSD: Single Shot MultiBox Detector," arXiv:1512.02325v5 [cs.CV], Dec. 29, 2016, 17 pages. As discussed in the specification.

* cited by examiner

Fig. 7

| ARITHMETIC CORE | FRAME NUMBER | | | |
|---|---|---|---|---|
| | #4 | #5 | #6 | #7 |
| CORE #0 | DIVIDED IMAGE #1 | DIVIDED IMAGE #1 | DIVIDED IMAGE #1 | DIVIDED IMAGE #1 |
| CORE #1 | DIVIDED IMAGE #2 | DIVIDED IMAGE #0 | DIVIDED IMAGE #2 | DIVIDED IMAGE #3 |

Fig. 8

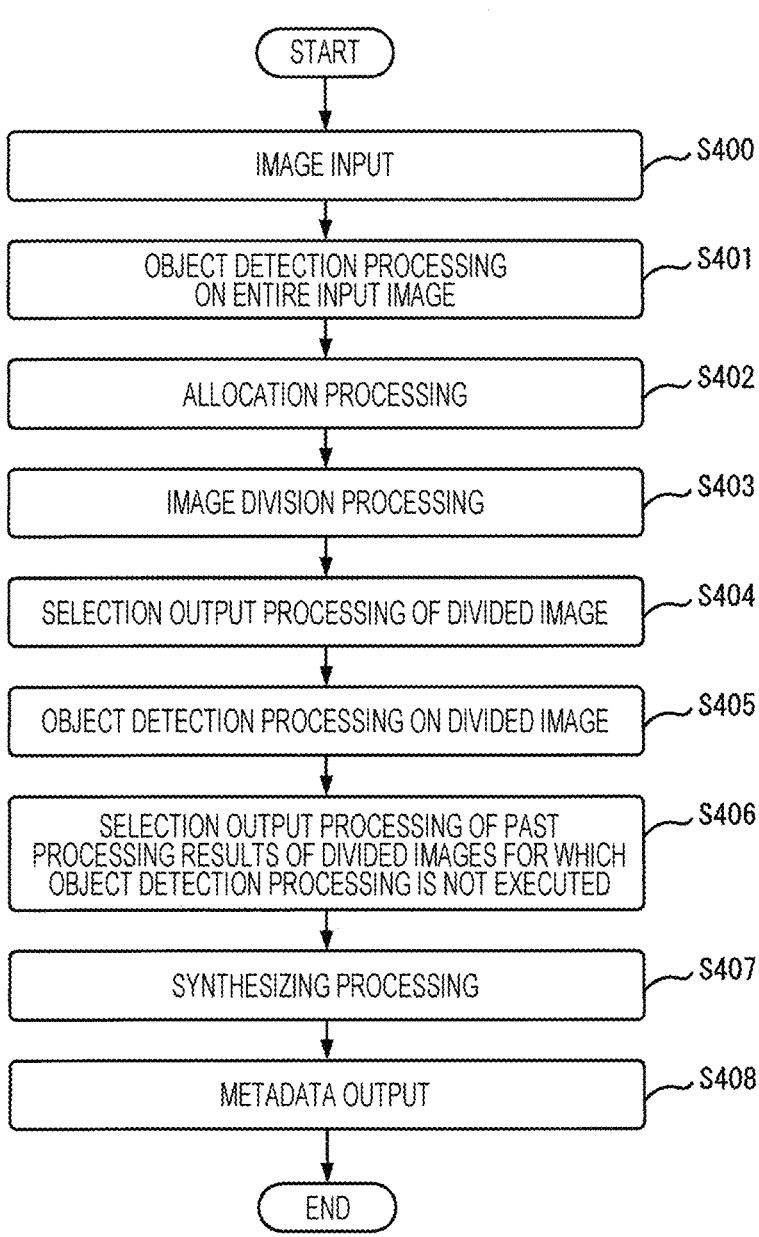

START

IMAGE INPUT — S400

OBJECT DETECTION PROCESSING ON ENTIRE INPUT IMAGE — S401

ALLOCATION PROCESSING — S402

IMAGE DIVISION PROCESSING — S403

SELECTION OUTPUT PROCESSING OF DIVIDED IMAGE — S404

OBJECT DETECTION PROCESSING ON DIVIDED IMAGE — S405

SELECTION OUTPUT PROCESSING OF PAST PROCESSING RESULTS OF DIVIDED IMAGES FOR WHICH OBJECT DETECTION PROCESSING IS NOT EXECUTED — S406

SYNTHESIZING PROCESSING — S407

METADATA OUTPUT — S408

END

OBJECT DETECTING DEVICE AND METHOD

CROSS-REFERENCE TO RELATED APPLICATIONS

This application is a national phase entry of PCT Application No. PCT/JP2021/021541, filed on Jun. 7, 2021, which application is hereby incorporated herein by reference.

TECHNICAL FIELD

The present invention relates to an object detecting device and a method for detecting an object from an input image.

BACKGROUND

An object detecting device is a device that detects, from an input image, metadata including positions (positions of rectangular frames surrounding objects), attributes (types of objects such as people or cars), and reliability of an object included in the image.

In recent years, methods such as You Only Look Once (YOLO) and Single Shot multibox Detector (SSD) for detecting metadata based on a deep learning result have been proposed, and use for artificial intelligence (AI) image processing and the like in monitoring cameras and edge computing has been studied (refer to Non Patent Literature 1 and Non Patent Literature 2). In these object detection methods based on deep learning, the input image size is restricted. For example, in YOLOv3 (Non Patent Literature 1), the pixel size is any of width 320 pixels×height 320 pixels, width 416 pixels×height 416 pixels, and width 608 pixels×height 608 pixels.

In order to perform object detection based on deep learning on a high definition image such as full high definition (HD) or 4K under the restriction of the input image size as described above, conventionally, the input image is reduced to the restricted image size to perform object detection. This reduction also reduces the characteristic part of the object, making it difficult to detect a small object included in the input image. A method of dividing an input image and performing object detection for each segmented image is also disclosed (refer to Non Patent Literature 3). However, it is difficult to detect a large object because a characteristic part is also divided for a large object that straddles the segmented images.

In order to enable detection of both large and small objects in a high definition image, a method is conceivable in which both of overall processing of reducing an input image to a restricted image size and performing object detection on a whole of the image and division processing of dividing the input image and performing object detection for each segmented image are performed, and a result of the overall processing and a result of the division processing are synthesized to obtain a final object detection result. This object detection method will be described with reference to FIG. 17.

In the overall processing, in order to reduce the input image to an image size that can be handled by object detection processing based on the deep learning result, the image scaling processing is performed, and then the detection processing is performed to detect the object included in the reduced image. The square frame (hereinafter BB) indicating the position of the detected object includes at least information of the center coordinates (X, Y) of the BB, the height (H) of the BB, and the width (W) of the BB. Since this information is for the reduced image, BB scaling (metadata scaling) is performed in order to map the reduced image to the original image before the reduction. For the detected object group after the scaling, objects of which reliability is equal to or greater than a preset reliability threshold value are selected, and the process proceeds to synthesizing processing in the subsequent stage.

On the other hand, in the division processing, after the input image is divided, the detection processing is performed for each segmented image, and the object included in each segmented image is detected. Since the BB indicating the position of the detected object is for the segmented image, metadata adjustment for mapping to the original image before the division is performed. After the adjustment, similarly to the overall processing, only objects of which reliability is equal to or greater than the reliability threshold value are selected, and the process proceeds to the synthesizing processing in the subsequent stage.

In the synthesizing processing, an object not detected in the overall processing is interpolated with an object detected in the division processing. In the selection of an object that is subject to interpolation, matching determination between the object detected in the overall processing and the object detected in the division processing is performed, and an object that does not match is output as an object that is subject to interpolation. In the processing of synthesizing with the object detected by the interpolation processing, the output result of the metadata selection processing for each segmented image and the output result of the overall processing are combined and output as a final object detection result.

With the method described with reference to FIG. 17, it is possible to detect both large and small objects at the same time even in a high-definition image exceeding the input image restriction size in the object detection method based on deep learning. However, in an ultra high-definition image such as 4K (3840 pixels×2160 pixels), there is a problem that the number of image divisions in the division processing increases and the calculation amount becomes enormous. For example, in the case of YOLOv3, the number of segmented images becomes 18 at the maximum even in YOLO having the maximum input image restriction size, and the calculation amount becomes enormous.

In order to reduce the calculation amount, application of a method of dividing into a frame of an image for executing object detection and a frame of an image for tracking an object (Non Patent Literature 4) is considered. In the frame in which the object is tracked, the position of the BB obtained by the frame in which the object detection is executed is corrected based on the motion vector value. By applying the method disclosed in Non Patent Literature 4, frames for executing object detection are thinned out, and thus the calculation amount can be reduced as compared with a case where object detection is executed for each frame.

However, the object detection result itself is not stable for an object group of which reliability is near the reliability threshold value, an adjacent object group, or an object group which is partially hidden. Therefore, the frame in which the object can be detected is lost by the frame thinning, and the object is hard to detect.

CITATION LIST

Non Patent Literature

Non Patent Literature 1: Joseph Redmon et al., "YOLOv3: An Incremental Improvement," 2018, Non Patent Literature 2: Wei Liu et al., "SSD: Single Shot MultiBox Detector," 2016

Non Patent Literature 3: Vit Ruzicka et al., "Fast and accurate object detection in high resolution 4K and 8K video using GPUs," 2018 IEEE High Performance extreme Computing Conference (HPEC)

Non Patent Literature 4: Takayuki Ujiie et al., "Load Mitigation of CNN-Based Object Detection Utilizing Motion Vector in Video Codecs," Technical Report of Information Processing Society of Japan, Vol. 2018-CVIM-210, No. 4, 2018.

SUMMARY

Technical Problem

Embodiments of the present invention have been made to solve the above problems, and an object thereof is to realize calculation amount reduction while suppressing occurrence of missing of object detection.

Solution to Problem

According to embodiments of the present invention, there is provided an object detecting device including: a division unit configured to divide an input image and output a plurality of segmented images; an overall processing unit configured to perform object detection processing on a reduced image obtained by scaling a whole of the input image for each frame; an allocation processing unit configured to determine a segmented image for each frame which is subject to object detection among the plurality of segmented images in advance in a cycle of N (N is an integer equal to or greater than a total number of segmented images) frames, and reserve the determined segmented image; a first selection processing unit configured to select and output, for each frame, some of the segmented images that are subject to object detection among the plurality of segmented images based on a reservation result from the allocation processing unit; a division processing unit configured to perform object detection processing on each of the segmented images output from the first selection processing unit; and a synthesizing processing unit configured to obtain a final object detection result by synthesizing an object detection result from the overall processing unit and an object detection result from the division processing unit for each frame.

In addition, in a first configuration example of the object detecting device according to embodiments of the present invention, the allocation processing unit includes an estimated fluctuation calculation unit configured to calculate an estimated value of the number of detected objects for each of the segmented images for each frame based on an object detection result from the overall processing unit, calculate an estimated value of a fluctuation between frames of the number of detected objects for each of the segmented images based on an absolute difference value between the frames of the estimated value, and calculate an average value of the estimated values of the fluctuations of the number of detected objects within the cycle for each of the segmented images; and a segmented image allocation processing unit configured to reserve a segmented image for each frame which is subject to object detection in a next cycle for the first selection processing unit such that the number of times object detection is executed is proportionally distributed to each segmented image based on an average value of estimated values of fluctuations of the number of detected objects for each segmented image.

Further, in the first configuration example of the object detecting device according to embodiments of the present invention, after determining that all the segmented images are selected for object detection at least M (M is an integer of 1 or more) times in a next cycle, the segmented image allocation processing unit determines the segmented image for each frame which is subject to object detection in the next cycle such that the number of times object detection is executed is proportionally distributed to each segmented image based on an average value of estimated values of fluctuations of the number of detected objects for each of the segmented images for the remaining allocable frames.

In addition, in the first configuration example of the object detecting device according to embodiments of the present invention, the estimated fluctuation calculation unit calculates an estimated value of the number of detected objects for each of the segmented images by aggregating the number of detected objects of which reliability calculated by the overall processing unit is less than a threshold value and equal to or greater than a threshold value/$\alpha$ ($\alpha$ is a real number of 2 or more) for each segmented image in which the object is positioned, within the object group detected by the overall processing unit.

Further, in the first configuration example of the object detecting device according to embodiments of the present invention, a holding unit configured to store an object detection result from the division processing unit; and a second selection processing unit configured to select and output, for each frame, a past object detection result stored in the holding unit for a segmented image for which object detection is not executed based on a reservation result from the allocation processing unit are further provided, and the synthesizing processing unit synthesizes the object detection result from the overall processing unit, the object detection result from the division processing unit, and the object detection result output from the second selection processing unit for each frame to obtain a final object detection result.

In addition, in the first configuration example of the object detecting device according to embodiments of the present invention, a scene fluctuation detection processing unit configured to determine whether the input image has changed based on a latest object detection result and a past object detection result from the division processing unit, is further provided, and the allocation processing unit cancels the reservation and returns the reservation to an initial state when it is determined that the input image has changed.

Further, according to embodiments of the present invention, there is provided an object detection method including: a first step of dividing an input image and outputting a plurality of segmented images; a second step of performing object detection processing on a reduced image obtained by scaling a whole of the input image for each frame; a third step of determining a segmented image for each frame which is subject to object detection among the plurality of segmented images in advance in a cycle of N (N is an integer equal to or greater than a total number of segmented images) frames, and reserving the determined segmented image; a fourth step of selecting and outputting, for each frame, some of the segmented images that are subject to object detection, among the plurality of segmented images based on a reservation result from the third step; a fifth step of performing object detection processing on each of the segmented images output in the fourth step; and a sixth step of obtaining a final object detection result by synthesizing an object detection result from the second step and an object detection result from the fifth step.

Advantageous Effects of Embodiments of the
Invention

According to embodiments of the present invention, by
providing the allocation processing unit that determines a
segmented image for each frame which is subject to object
detection among a plurality of segmented images in advance
in a cycle of N frames and reserves the determined seg-
mented image, and a first selection processing unit that
selects and outputs some of the segmented images that are
subject to object detection among the plurality of segmented
images for each frame based on a result of the reservation by
the allocation processing unit, it is possible to reduce a
calculation amount while suppressing occurrence of missing
of object detection.

BRIEF DESCRIPTION OF THE DRAWINGS

FIG. 7 is a flowchart for explaining a specific example of
the reservation processing by the segmented image alloca-
tion processing unit according to the first example of the
present invention.

FIG. 8 is a flowchart for explaining a flow of object
detection processing by the object detecting device accord-
ing to the first example of the present invention.

DETAILED DESCRIPTION OF ILLUSTRATIVE
EMBODIMENTS

First Example

Figure 1:
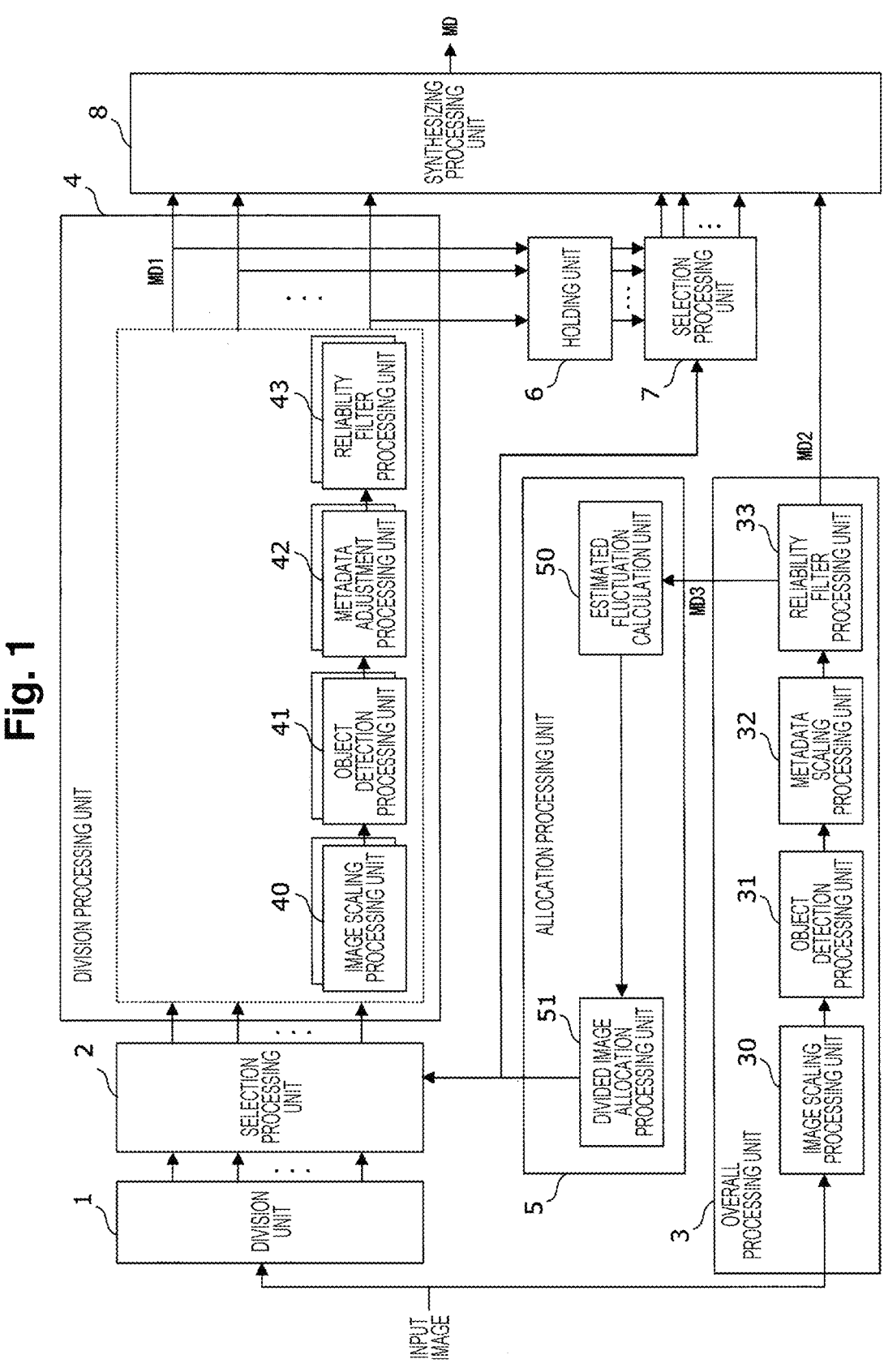
FIG. 1 is a block diagram illustrating a configuration of an
object detecting device according to a first example of the
present invention.

Hereinafter, examples of the present invention will be
described with reference to the drawings. FIG. 1 is a block
diagram illustrating a configuration of an object detecting
device according to a first example of the present invention.
The object detecting device executes object detection pro-
cessing on an input image. Then, the object detecting device
outputs an object detection result from the object detection
processing as metadata. The object detecting device outputs
metadata including at least position information of the object
included in the input image, attribute information of the
object, and reliability.

The object detecting device includes a division unit 1, a
selection processing unit 2, an overall processing unit 3, a
division processing unit 4, an allocation processing unit 5, a
holding unit 6, a selection processing unit 7, and a synthe-
sizing processing unit 8.

The overall processing unit 3 includes an image scaling
processing unit 30, an object detection processing unit 31, a
metadata scaling processing unit 32, and a reliability filter
processing unit 33.

The division processing unit 4 includes an image scaling
processing unit 40, an object detection processing unit 41, a
metadata adjustment processing unit 42, and a reliability
filter processing unit 43.

The allocation processing unit 5 includes an estimated
fluctuation calculation unit 50 and a segmented image
allocation processing unit 51.

The image scaling processing unit 30 of the overall
processing unit 3 executes scaling processing of reducing
the input image to an image size that can be input to the
object detection processing based on the deep learning
result. The image scaling processing unit 30 can reduce the
image size while maintaining the ratio between the width
and the height of the input image. As a reduction method, for
example, there is a bilinear interpolation method.

The object detection processing unit 31 of the overall
processing unit 3 uses the input image reduced by the image
scaling processing unit 30 as an input to calculate a learned
object detection model based on predetermined deep learn-
ing. The object detection processing unit 31 gives a reduced
input image as an input to an object detection model
prepared in advance, performs an operation of the object
detection model, and generates a set of attribute information
including an attribute value of an object included in the input
image and a bounding box (BB) as metadata of the input
image.

The attribute value represents the unique appearance,
shape, and properties of the object. Examples of the attribute
value include "dog," "bicycle," and "car."

The bounding box (BB) has, for example, a minimum
rectangular range that can circumscribe the detected object
and surround the object. The BB information included in the
metadata of the input image includes at least information of
center coordinates (X, Y) of the BB, the height (H) of the
BB, and the width (W) of the BB.

The object detection processing unit 31 detects an object included in the input image using, for example, an object detection model such as YOLO using a convolutional neural network (CNN) learned in advance by an arithmetic device such as an external server.

The metadata scaling processing unit 32 of the overall processing unit 3 performs scaling processing of enlarging the BB included in the metadata of the input image generated by the object detection processing unit 31 to correspond to the size of the input image before reduction. The scaling processing is performed because the metadata generated by the object detection processing unit 31 is for the reduced input image. The metadata scaling processing unit 32 scales the BB included in the metadata of the input image using, for example, a bilinear interpolation method.

For example, the width of the input image is $W_{in}$, the height is $H_{in}$, the width of the input image reduced by the image scaling processing unit 30 is $W_{det}$, and the height is $H_{det}$. In this case, the metadata scaling processing unit 32 maps the BB on the original input image by scaling the center coordinates $(X_{bb}, Y_{bb})$ of the BB included in the metadata of the input image to $(X_{bb} \times W_{in}/W_{det}, Y_{bb} \times H_{in}/H_{det})$ and scaling the width $W_{bb}$ and the height $H_{bb}$ of the BB to $W_{bb} \times W_{in}/W_{det}$ and $H_{bb} \times H_{in}/H_{det}$, respectively.

The reliability filter processing unit 33 of the overall processing unit 3 selects an object having reliability equal to or higher than a preset reliability threshold value Th from the detected object group scaled by the metadata scaling processing unit 32. The reliability filter processing unit 33 sends metadata MD2 of the object of which reliability is equal to or greater than the reliability threshold value Th to the synthesizing processing unit 8. Further, the reliability filter processing unit 33 sends metadata MD3 of the object of which reliability is less than the reliability threshold value Th to the allocation processing unit 5.

Figure 2:
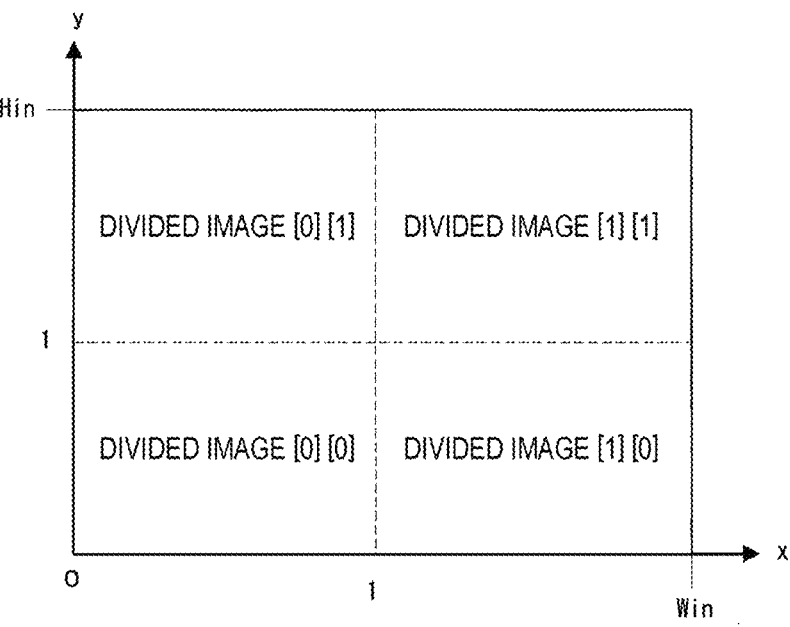
FIG. 2 is a diagram for explaining a segmented image
processed by the object detecting device according to the
first example of the present invention.

The division unit 1 of the division processing unit 4 divides the input image into a plurality of segmented images. The number of divisions in the width direction of the input image is $N_w$, and the number of divisions in the height direction is $N_h$. For example, in the example illustrated in FIG. 2, the input image is divided into a total of four segmented images of $N_w = 2$ and $N_h = 2$.

The selection processing unit 2 selectively outputs some segmented images among the plurality of segmented images divided by the division unit 1. Details of the processing of the selection processing unit 2 will be described later.

The image scaling processing unit 40 of the division processing unit 4 performs scaling processing of reducing each of the plurality of segmented images output from the selection processing unit 2 to a designated image size that can be input to the object detection model based on deep learning. The image scaling processing unit 40 reduces the image size while maintaining the parameter value such as the ratio between the width and the height of each segmented image to correspond to the size of the input image of the object detection model used by the object detection processing unit 41 described later.

The object detection processing unit 41 of the division processing unit 4 uses the segmented image reduced by the image scaling processing unit 40 as an input to perform an operation of a learned object detection model based on predetermined deep learning for each segmented image. The object detection processing unit 41 gives a reduced segmented image as an input to an object detection model prepared in advance, performs an operation of the object detection model, and generates a set of attribute information including an attribute value of an object included in the segmented image and a BB as metadata of the segmented image. The BB information included in the metadata of the segmented image includes at least information of center coordinates (X, Y) of the BB, the height (H) of the BB, and the width (W) of the BB.

The object detection processing unit 41 detects an object included in the segmented image using, for example, an object detection model such as YOLO using a convolutional neural network (CNN) learned in advance by an arithmetic device such as an external server.

Here, the width of the input image is $W_{in}$, the height is $H_{in}$, the width of the specified image size that can be input to the object detection model prepared in advance is $W_{det}$, and the height is $H_{det}$. In this case, the number of divisions $N_w$ in the width direction and the number of divisions $N_h$ in the height direction of the input image are given by the following formulas (1) and (2). $N_{w\_max}$ is an upper limit value of the number of divisions in the width direction of the input image, and $N_{h\_max}$ is an upper limit value of the number of divisions in the height direction of the input image.

$$N_w = \min\left(N_{w\_max}, \text{ceiling}\left(W_{in}/W_{\text{det}}\right)\right) \qquad (1)$$

$$N_h = \min\left(N_{h\_max}, \text{ceiling}\left(H_{in}/H_{\text{det}}\right)\right) \qquad (2)$$

The term "ceiling ( )" in formulas (1) and (2) means a function for rounding up a numerical value to a specified number of digits, $\min(N_{w\_max}, \text{ceiling}(W_{in}/W_{det}))$ means taking a smaller value of $N_{w\_max}$ and $\text{ceiling}(W_{in}/W_{det})$.

The metadata adjustment processing unit 42 of the division processing unit 4 performs metadata adjustment processing for mapping the BB detected by the object detection processing unit 41 to the original image before the division, that is, the input image, for each segmented image input to the object detection processing unit 41. The center coordinates of the BB detected in the $N_{div}$ segmented images[i][j] ($0 \leq i \leq N_w - 1$, $0 \leq j \leq N_h - 1$) are represented by $(x_{bb\_div}, y_{bb\_div})$, the width is represented by $w_{bb\_div}$, the height is represented by $h_{bb\_div}$, the center coordinates of the BB after adjustment to the coordinates of the original image are represented by $(x_{bb}, y_{bb})$, the width is represented by $w_{bb}$, and the height is represented by $h_{bb}$.

The metadata adjustment processing unit 42 maps the BB detected by the object detection processing unit 41 on the input image based on the following formulas.

$$x_{bb} = x_{bb\_div} \times \text{floor}\left(W_{in}/N_w\right) + \text{floor}\left(W_{in}/N_w\right) \times I \qquad (3)$$

$$y_{bb} = y_{bb\_div} \times \text{floor}\left(H_{in}/N_h\right) + \text{floor}\left(H_{in}/N_h\right) \times j \qquad (4)$$

$$w_{bb} = w_{bb\_div} \times \text{floor}\left(W_{in}/N_w\right) \qquad (5)$$

$$h_{bb} = h_{bb\_div} \times \text{floor}\left(H_{in}/N_h\right) \qquad (6)$$

The term "flow ( )" in formulas (3) to (6) means a function for rounding down a numerical value to a specified number of digits.

The reliability filter processing unit 43 of the division processing unit 4 selects an object of which reliability is equal to or greater than the preset reliability threshold value Th from the detected object group after the metadata is adjusted by the metadata adjustment processing unit 42. Metadata MD1 of the object selected by the reliability filter processing unit 43 is output to the synthesizing processing unit 8 and stored by the holding unit 6.

The selection processing unit 7 selectively outputs some detection results among the past detection results stored by the holding unit 6. Details of the processing of the selection processing unit 7 will be described later.

The synthesizing processing unit 8 performs processing in which an object not detected by the overall processing unit 3 is interpolated with an object detected by the division processing unit 4. The synthesizing processing unit 8 performs metadata selection processing of determining whether the object detected by the overall processing unit 3 matches the object detected by the division processing unit 4, and determining a non-matching object as an object that is subject to interpolation. This metadata selection processing will be described.

The synthesizing processing unit 8 compares the metadata MD1 of one segmented image among the plurality of segmented images with the metadata MD2 of a whole of the image, and determines whether or not the attribute value of the metadata MD2 of the whole of the image matches the attribute value of the metadata MD1 of the segmented image. In the case of matching, the synthesizing processing unit 8 calculates the overlap degree. Specifically, the synthesizing processing unit 8 calculates the overlap degree obtained by dividing the area of overlap between the BB included in the metadata MD2 of the whole of the image and the BB included in the metadata MD1 of the segmented image by the area of the BB included in the metadata MD1 of the segmented image. The synthesizing processing unit 8 performs such determination of match/mismatch and calculation of the overlap degree for each segmented image.

Then, in a case where the overlap degree exceeds a preset threshold value, the synthesizing processing unit 8 determines that the attribute information of the metadata MD1 of the segmented image and the attribute information of the metadata MD2 of the whole of the image are the same attribute information, and removes the same attribute information from the metadata MD1 of the segmented image.

Further, the synthesizing processing unit 8 performs metadata total processing of combining the metadata MD1 of the segmented images after the metadata selection processing and the metadata MD2 of the whole of the image and outputting the combined result as a final object detection result. That is, the synthesizing processing unit 8 generates the metadata MD of the input image by interpolating the metadata MD2 of the whole of the image with the metadata MD1 of the segmented images from which the overlapping attribute information has been excluded.

Next, operations of the allocation processing unit 5 and the selection processing units 2 and 7 will be described. The allocation processing unit 5 dynamically controls the frame rate at which the object detection is executed for each segmented image based on the object detection result of the overall processing unit 3. Specifically, the allocation processing unit 5 estimates the fluctuation of the number of detected objects for each segmented image from the processing result of the overall processing unit 3, and decreases the thinning rate of frames for executing object detection of a segmented image (segmented image in which object detection is unstable) having a large estimation fluctuation. In addition, the allocation processing unit 5 increases a frame thinning rate of a segmented image (segmented image in which object detection is stable) having a small estimation fluctuation. As a result, difficulty in object detection due to frame thinning is avoided, and a reduction in calculation amount is realized while stable object detection is maintained. Even in the segmented image in which the fluctuation of the number of detected objects is small, an upper limit is set to the number of frames to be thinned out such that the segmented image can follow the change accompanying the movement of the object or the like. Note that the overall processing unit 3 executes object detection processing on the input image for each frame.

The division processing unit 4 records the object detection result in the holding unit 6 each time the object detection processing of each segmented image is executed. The synthesizing processing unit 8 uses the latest object detection result for the group of segmented images for which the object detection has been executed, and uses the past object detection results stored in the holding unit 6 for the group of segmented images for which the object detection has not been executed, to perform synthesizing processing with the object detection result of the whole of the image, thereby obtaining a final object detection result.

The estimated fluctuation is obtained from the detection result of the overall processing unit 3 by the following procedure. First, the estimated fluctuation calculation unit 50 of the allocation processing unit 5 extracts, from the object detection result of the overall processing unit 3, an object group of which reliability is equal to or greater than the reliability threshold value Th when the reliability is multiplied by $\alpha$ ($\alpha$ is a real number of 2 or more) among the object groups excluded by the reliability filter processing unit 33 of the overall processing unit 3. Specifically, the reliability filter processing unit 33 outputs the metadata MD3 of the object of which reliability is less than the reliability threshold value Th. The estimated fluctuation calculation unit 50 extracts an object group of which reliability is equal to or greater than the reliability threshold value Th when the reliability is multiplied by a among the object group of which reliability is less than the reliability threshold value Th.

Next, the estimated fluctuation calculation unit 50 confirms in which of the coordinate ranges of the segmented images the center coordinates of each of the extracted object groups are positioned. Then, the estimated fluctuation calculation unit 50 increments the estimated value of the number of detected objects in the segmented image including the center coordinates of the extracted object. For example, when the center coordinates of the extracted object are positioned within the coordinate range of the segmented image #0, the estimated fluctuation calculation unit 50 increments the estimated value of the number of detected objects of the segmented image #0. Such an increment of the estimated value of the number of detected objects is performed for each extracted object to obtain the estimated value of the number of detected objects in each segmented image.

Figure 3:
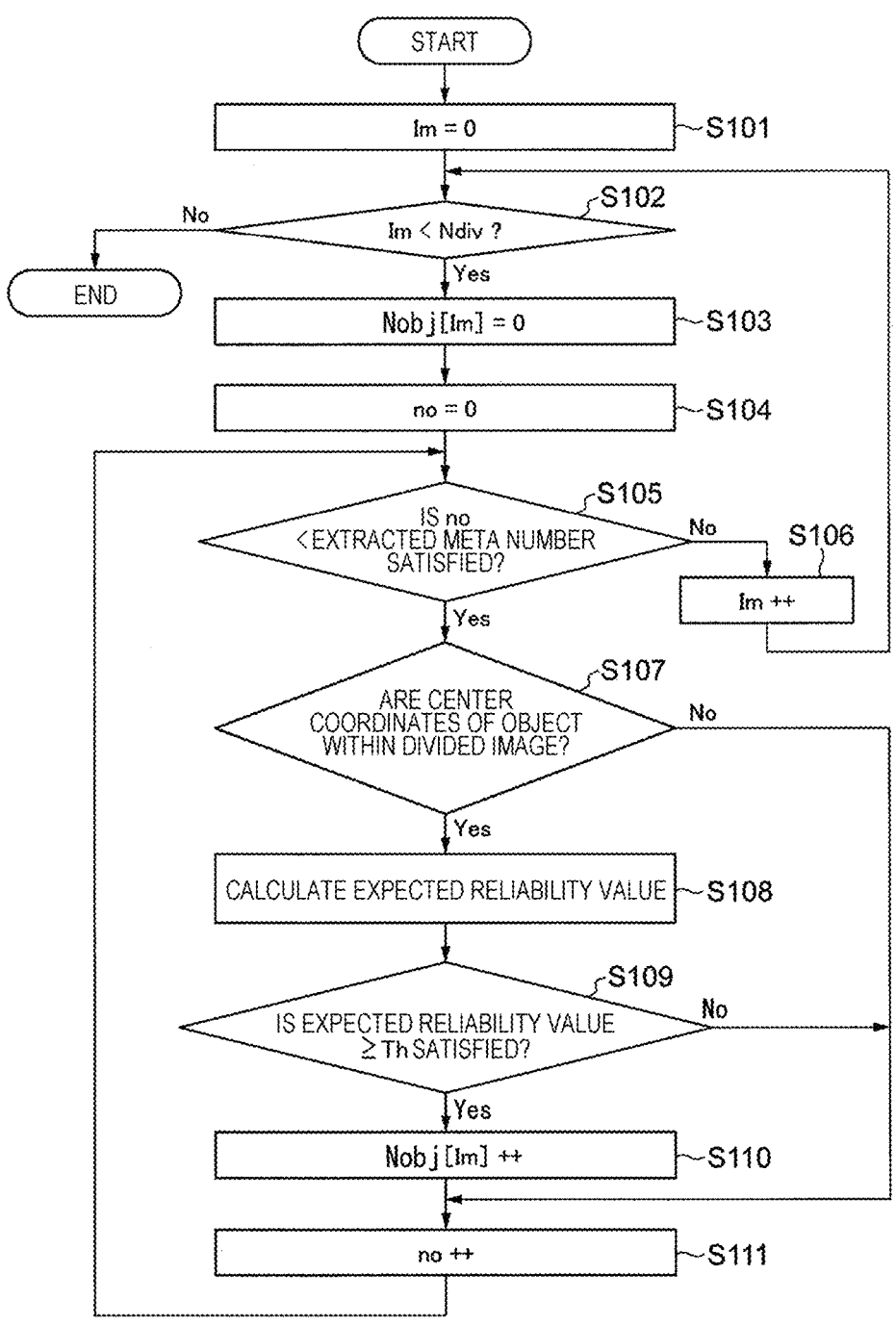
FIG. 3 is a flowchart for explaining processing of calcu-
lating an estimated value of the number of detected objects
in a segmented image according to the first example of the
present invention.

FIG. 3 is a flowchart for explaining processing of calculating an estimated value of the number of detected objects in a segmented image. The estimated fluctuation calculation unit 50 sets a variable Im to 0 (step S101 in FIG. 3). The variable Im is a number assigned to each segmented image, and takes values from 0 to ($N_{div}-1$). The estimated fluctuation calculation unit 50 determines whether the variable Im is less than the total number of segmented images $N_{div}$ (step S102 in FIG. 3). When the variable Im is not less than the total number of segmented images $N_{div}$ (No in step S102), the estimated fluctuation calculation unit 50 ends a series of detected object number estimated value calculation processing.

When the variable Im is less than the total number of segmented images $N_{div}$ (Yes in step S102), the estimated fluctuation calculation unit 50 sets the estimated value Nobj[Im] of the number of detected objects of the segmented image with the number Im to 0 (step S103 in FIG. 3).

The estimated fluctuation calculation unit 50 sets a variable no to 0 (step S104 in FIG. 3). The variable no is the number assigned to each object of which reliability is less than the reliability threshold value Th and detected by the overall processing unit 3. The estimated fluctuation calculation unit 50 determines whether or not the variable no is less than the extracted meta number (step S105 in FIG. 3). The extracted meta number is the number of objects of which reliability is less than the reliability threshold value Th detected by the overall processing unit 3.

When the variable no is equal to or greater than the extracted meta number (No in step S105), the estimated fluctuation calculation unit 50 increments the variable Im by one (step S106 in FIG. 3). When the processing of step S106 ends, the estimated fluctuation calculation unit 50 returns to the processing of step S102.

On the other hand, when the variable no is less than the extracted meta number (Yes in step S105), the estimated fluctuation calculation unit 50 determines whether or not the center coordinates of the object with the number no are within the coordinate range of the segmented image with the number Im in the object group of which reliability is less than the reliability threshold value Th (step S107 in FIG. 3). Note that the coordinates on the boundary line of each segmented image are the coordinates of only any one of the segmented images, and do not overlap each other.

When the center coordinates of the object with the number no are within the coordinate range of the segmented image with the number Im (Yes in step S107), the estimated fluctuation calculation unit 50 calculates a value obtained by multiplying the reliability of the object with the number no by a predetermined coefficient a as an expected reliability value (step S108 in FIG. 3). Here, the coefficient a is a value representing a ratio at which the reliability is improved by reduction and relaxation of the characteristic part of the object by the division processing as compared with the overall processing.

The estimated fluctuation calculation unit 50 determines whether or not the expected reliability value obtained in step S108 is equal to or greater than the reliability threshold value Th (step S109 in FIG. 3). When the expected reliability value is equal to or greater than the reliability threshold value Th (Yes in step S109), the estimated fluctuation calculation unit 50 increments the estimated value Nobj[Im] of the number of detected objects in the segmented image with the number Im by one (step S110 in FIG. 3).

Subsequently, the estimated fluctuation calculation unit 50 increments the variable no by one (step S111 in FIG. 3), and returns to step S105. When the center coordinates of the object with the number no are not within the coordinate range of the segmented image with the number Im (No in step S107) or when the expected reliability value is less than the reliability threshold value Th (No in step S109), the estimated fluctuation calculation unit 50 skips the processing up to step S111.

In this manner, the estimated fluctuation calculation unit 50 can obtain the estimated value Nobj of the number of detected objects of each segmented image by executing the series of processing illustrated in FIG. 3.

Next, the estimated fluctuation calculation unit 50 calculates, for each segmented image, an absolute difference value between the estimated value Nobj of the number of detected objects of each segmented image and the estimated value Nobj of the number of detected objects of each segmented image in the previous frame, thereby obtaining an estimated fluctuation value for each segmented image.

Here, the coefficient a is a ratio between the reliability detected in a whole of the image and the reliability detected in the segmented image for the same object. In the present example, a is a predetermined single real value, but may be a different value for each coordinate range of the segmented image. In addition, a may be corrected based on an error between the estimated value of the number of detected objects of the segmented image and the actual number of detected objects.

The control of the frame thinning rate is realized by determining allocation of frames and arithmetic cores for executing object detection with respect to each segmented image in a cycle of N frames (N is an integer equal to or greater than the total number of segmented images $N_{div}$). Here, the arithmetic core is an arithmetic core that functions as the object detection processing unit 41, and the number of arithmetic cores is set to be the number smaller than the total number of segmented images $N_{div}$ in order to reduce the calculation amount. That is, the object detection processing unit 41, the image scaling processing unit 40, the metadata adjustment processing unit 42, and the reliability filter processing unit 43 are provided as many as the number of arithmetic cores.

Figure 4:
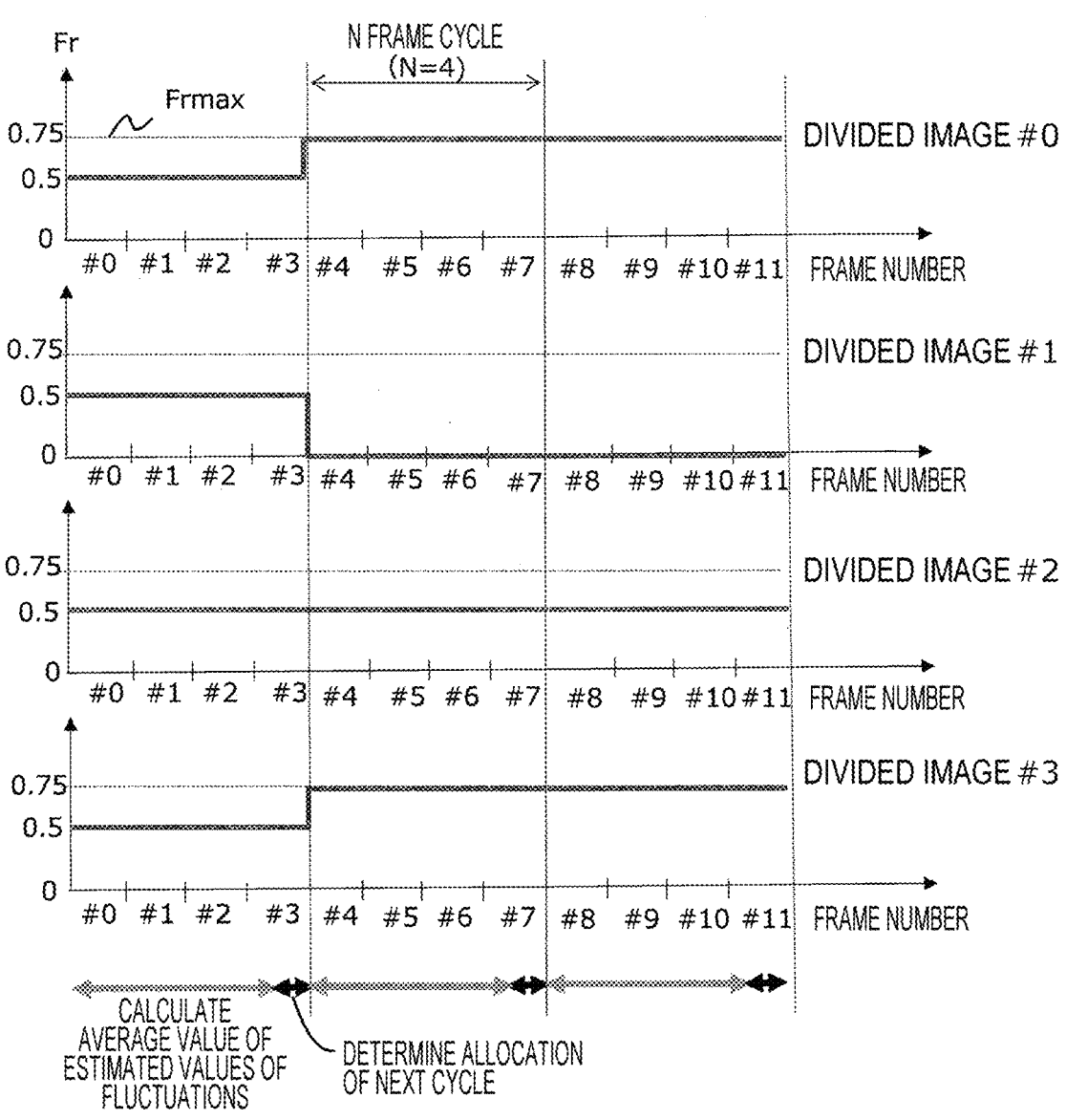
FIG. 4 is a diagram illustrating an example of allocation
processing by an allocation processing unit according to the
first example of the present invention.

FIG. 4 is a diagram illustrating an example of allocation processing. Here, it is assumed that the total number of segmented images $N_{div}$=4, N=4, and the number of arithmetic cores functioning as the object detection processing unit 41 is 2. In FIG. 4, the vertical axis represents a frame thinning rate Fr, and the horizontal axis represents the frame number. In the example of FIG. 4, an upper limit $Fr_{max}$ of the frame thinning rate Fr is set to 0.75. In the initial state, the frame thinning rate Fr is equal among the segmented images.

First, the estimated fluctuation calculation unit 50 calculates an estimated value of the fluctuation of the number of detected objects of each segmented image for each frame within one cycle (for example, frames with numbers #0 to #3) from the processing result of the overall processing unit 3, and calculates a cumulative value of the estimated value of the fluctuation for one cycle for each segmented image. A method of calculating the estimated value of the fluctuation of the number of detected objects of each segmented image is as described above.

Then, when reaching the last frame (for example, the frame with number #3) in one cycle, the estimated fluctuation calculation unit 50 calculates an average value $E_{ave}$[Im] of the estimated values of the fluctuations of the number of detected objects in one cycle for each segmented image by dividing the cumulative value of the estimated values of the fluctuations for each segmented image by N(=4).

Based on the average value $E_{ave}$[Im] of the estimated value of the fluctuation in the number of detected objects for each segmented image calculated by the estimated fluctuation calculation unit 50, the segmented image allocation processing unit 51 of the allocation processing unit 5 reserves the arithmetic core and the segmented image for each frame, which are subject to object detection in the next cycle, with respect to the selection processing unit 2, such that the number of times object detection is executed (allocation amount) is proportionally distributed to each segmented image.

As described above, in the segmented image in which the average value $E_{ave}$[Im] of the estimated value of the fluctuation of the number of detected objects is small, the frame thinning rate Fr is high. Meanwhile, in the segmented image in which the average value $E_{ave}[Im]$ of the estimated value of the fluctuation of the number of detected objects is large, the frame thinning rate Fr is low. In this manner, dynamic control of the frame thinning rate Fr for each segmented image is realized.

Figure 5:
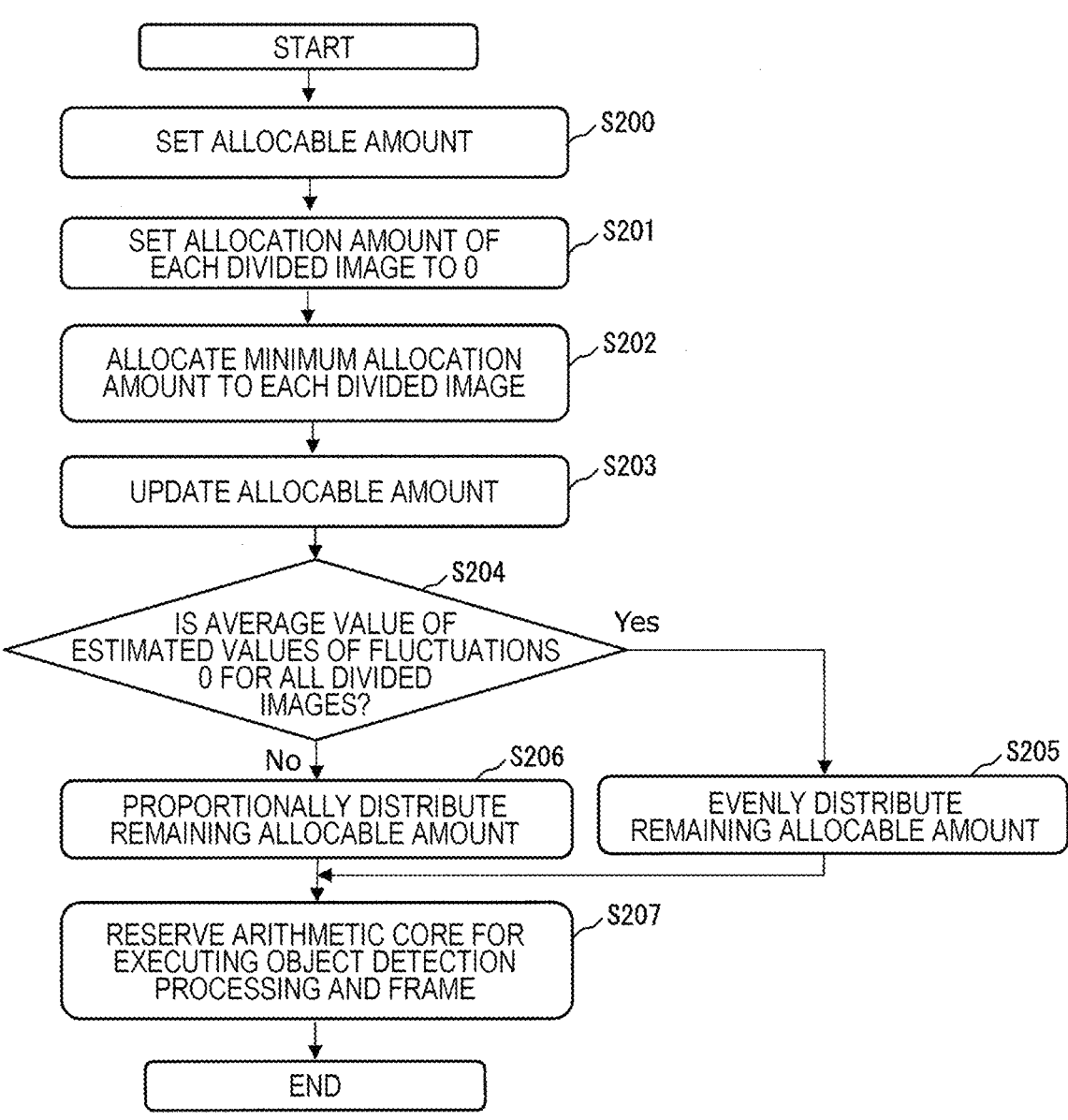
FIG. 5 is a flowchart for explaining an operation of a
segmented image allocation processing unit according to the
first example of the present invention.

FIG. 5 is a flowchart for explaining the operation of the segmented image allocation processing unit 51. First, the segmented image allocation processing unit 51 sets an allocable amount $J_n$ (step S200 in FIG. 5). A total allocable amount $J_{total}$ is an integer value obtained by multiplying N by the number of arithmetic cores, and is the number of times of object detection that can be executed within one cycle. In the above example, since N=4 and the number of arithmetic cores is 2, the total allocable amount $J_{total}$ is 8. At the time of step S200, the allocable amount $J_n$ is set to a value equal to the total allocable amount $J_{total}$.

The segmented image allocation processing unit 51 sets the allocation amount J[Im] of each segmented image to 0 (step S201 in FIG. 5). The allocation amount J[Im] is a value in which the number of times object detection is executed for one segmented image within one cycle is determined for each segmented image.

Next, the segmented image allocation processing unit 51 sets the allocation amount J[Im] of all the segmented images to a minimum allocation amount $J_{min}$ corresponding to the upper limit $Fr_{max}$ of the frame thinning rate Fr (step S202 in FIG. 5). As a result, the thinning rate Fr of the frames of all the segmented images is set to the upper limit $Fr_{max}$. In the present example, the minimum allocation amount $J_{min}$ is set to M. M is a predetermined integer of 1 or more. By setting the minimum allocation amount $J_{min}$ to M, all the segmented images are selected for the object detection at least M times in one cycle.

Since the allocation amounts J[Im] of each segmented image are set to the minimum allocation amount $J_{min}$, the segmented image allocation processing unit 51 updates a value obtained by subtracting the multiplication result of $N_{div} \times J_{min}$ from the current allocable amount $J_n$ as the latest allocable amount $J_n$ (step S203 in FIG. 5).

Subsequently, the segmented image allocation processing unit 51 confirms whether or not the average value $E_{ave}[Im]$ of the estimated values of the fluctuations of the number of detected objects is 0 for all the segmented images (step S204 in FIG. 5). A case where the average value $E_{ave}[Im]$ of the estimated values of the fluctuations of the number of detected objects is 0 in all the segmented images means that there is no fluctuation of the number of detected objects in all the segmented images. Therefore, the segmented image allocation processing unit 51 evenly distributes the remaining allocable amount $J_n$ (the number of times object detection can be executed) to the allocation amount J[Im] of each segmented image (step S205 in FIG. 5).

In the equal distribution in step S205, the segmented image allocation processing unit 51 calculates the allocation amount J[Im] of each segmented image as in the following formula.

$$J_{new}[Im] = J_{old}[Im] + \text{Floor}(J_n / N_{div}) \qquad (7)$$

$J_{old}[Im]$ is an allocation amount of each segmented image before distribution, and $J_{new}[Im]$ is an allocation amount of each segmented image after distribution. Furthermore, in a case where the average value $E_{ave}[Im]$ of the estimated values of the fluctuations of the number of detected objects is not 0 for at least some of the segmented images (No in step S204), the segmented image allocation processing unit 51 weights the remaining allocable amount $J_n$ by a ratio of the average value $E_{ave}[Im]$ of the estimated values of the fluctuations and distributes the weighted amount to the allocation amount J[Im] of each of the segmented images (step S206 in FIG. 5).

In the proportional distribution in step S206, the segmented image allocation processing unit 51 calculates the allocation amount J[Im] of each segmented image as in the following formula.

$$J_{new}[Im] = J_{old}[Im] + \min(N, \text{Floor}(J_n \times (E_{ave}[Im]/\Sigma E_{ave}[Im]))) \qquad (8)$$

It goes without saying that $\Sigma E_{ave}[Im]$ in Formula (8) is the sum of the average values of the estimated values of the fluctuations of the number of detected objects in all the segmented images, min (N, Floor($J_n \times (E_{ave}[Im]/\Sigma E_{ave}[Im])$)) means taking a smaller value of N and Floor($J_n \times (E_{ave}[Im]/\Sigma E_{ave}[Im])$).

Note that an unallocation amount (a value obtained by subtracting the sum of the allocation amounts J[Im] of the respective segmented images from the remaining allocable amount $J_n$) that has not been distributed in step S205 or S206 may occur. In this case, the segmented image allocation processing unit 51 may equally distribute the unallocation amount to all the segmented images within a range not exceeding N, or may distribute the unallocation amount to a segmented image having a large allocation amount J[Im] or a segmented image having a small allocation amount J[Im].

When the allocation amount J[Im] of each segmented image is determined in step S205 or S206, the segmented image allocation processing unit 51 reserves the arithmetic core for executing the object detection processing and reserves the segmented image and the frame, which are the object subject to detection processing, for the selection processing units 2 and 7, in order from the segmented image having the larger allocation amount J[Im] (step S207 in FIG. 5).

Figure 6:
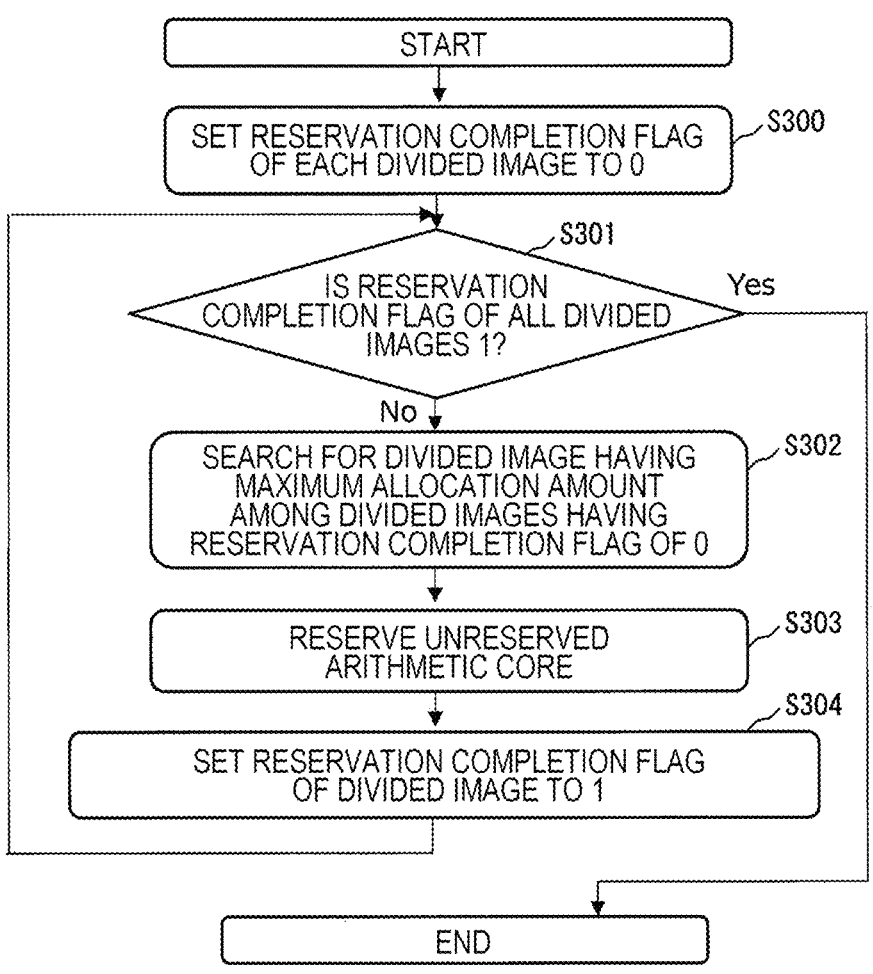
FIG. 6 is a flowchart for explaining reservation processing
by the segmented image allocation processing unit accord-
ing to the first example of the present invention.

FIG. 6 is a flowchart for explaining reservation processing in step S207. First, the segmented image allocation processing unit 51 sets the reservation completion flag of each segmented image to 0 (step S300 in FIG. 6). Subsequently, the segmented image allocation processing unit 51 determines whether the reservation completion flag of each segmented image is 1 (step S301 in FIG. 6).

Here, since the reservation completion flag of each segmented image is 0, the process proceeds to step S302. The segmented image allocation processing unit 51 searches for a segmented image having the maximum allocation amount J[Im] among the segmented images having the reservation completion flag of 0 for reservation (step S302 in FIG. 6). The number of the searched segmented images, which are subject to reservation, are i, and the allocation amount is J[i].

Then, the segmented image allocation processing unit 51 reserves the unreserved arithmetic core for the object detection processing of the segmented image, which is subject to reservation, such that the object detection processing is executed J[i]/$N_d$ times for each $N_d$ frame with respect to the segmented image, which is subject to reservation (step S303 in FIG. 6). $N_d$ is an integer of 1 or more and less than N. However, in this reservation, the same segmented image is reserved only once for each frame.

The segmented image allocation processing unit 51 sets the reservation completion flag of the segmented image with the number i of which reservation has ended to 1 (step S304 in FIG. 6), and returns to step S301.

In this manner, the arithmetic cores are allocated to the segmented images with the reservation completion flag of 0 (reservation uncompleted) in descending order of the allocation amount J[Im], for reservation.

When the reservation completion flags of all the segmented images become 1 (Yes in step S301), the reservation processing (step S207) ends.

In addition, when there is no unreserved arithmetic core within the period of the $N_d$ frame at the time of reservation for each $N_d$ frame in step S303, the segmented image allocation processing unit 51 may reserve the unreserved arithmetic core within the period of the next $N_d$ frame for the object detection processing of the segmented image which is subject to reservation.

A specific example of the reservation processing will be described with reference to FIGS. 4 and 7. From the calculation result of the average value $E_{ave}$[Im] of the estimated values of the fluctuations of the number of detected objects in one cycle (frames with numbers #0 to #3) in FIG. 4, when the arithmetic core in the next cycle (frames with numbers #4 to #7) is reserved for the object detection processing of the segmented image, it is assumed that the allocation amount J[0] of the segmented image with the number #0 is 1, the allocation amount J[1] of the segmented image with the number #1 is 4, the allocation amount J[2] of the segmented image with the number #2 is 2, and the allocation amount J[3] of the segmented image with the number #3 is 1. $N_d$ is 2.

First, the segmented image allocation processing unit 51 reserves the arithmetic core with number #0 two times in the frames with numbers #4 and #5 and further reserves the arithmetic core with number #0 two times in the frames with numbers #6 and #7 for the segmented image with number #1 having the largest allocation amount J[1]. Next, the segmented image allocation processing unit 51 reserves the arithmetic core with number #1 one time in the frames with numbers #4 and #5 and further reserves the arithmetic core with number #1 one time in the frames with numbers #6 and #7 for the segmented image with number #2 having the second largest allocation amount J[2].

Subsequently, the segmented image allocation processing unit 51 performs reservation from the segmented image with the smaller number among the segmented images with the same allocation amounts J[0] and J[3] and with the numbers #0 and #3. Specifically, the segmented image allocation processing unit 51 reserves the arithmetic core with number #1 one time in the frames with numbers #4 and #5 for the segmented image with number #0. Finally, the segmented image allocation processing unit 51 tries to reserve the arithmetic core in the frames with numbers #4 and #5 for the segmented image with number #3, but there is already no unreserved arithmetic core in the frames with numbers #4 and #5, and thus, reserves the arithmetic core with number #1 one time in the frames with numbers #6 and #7. FIG. 7 illustrates the above reservation result.

Next, operations of the selection processing units 2 and 7, the division processing unit 4, the holding unit 6, and the synthesizing processing unit 8 according to the reservation processing will be described.

By the reservation processing by the segmented image allocation processing unit 51, in the next cycle, the segmented image is selected for each frame and the object detection processing is executed. For example, based on the reservation result for the frame with number #4 in FIG. 7, the selection processing unit 2 outputs the segmented image with number #1 to the image scaling processing unit 40 corresponding to the arithmetic core with number #0 such that the object detection processing for the segmented image with number #1 is executed by the arithmetic core with number #0 (the object detection processing unit 41 with number #0), the image scaling processing unit 40 corresponding to the arithmetic core, the metadata adjustment processing unit 42, and the reliability filter processing unit 43.

In addition, based on the reservation result for the frame with number #4, the selection processing unit 2 outputs the segmented image with number #2 to the image scaling processing unit 40 corresponding to the arithmetic core with number #1 such that the object detection processing for the segmented image with number #2 is executed by the arithmetic core with number #1 (the object detection processing unit 41 with number #1), the image scaling processing unit 40 corresponding to the arithmetic core, the metadata adjustment processing unit 42, and the reliability filter processing unit 43.

The metadata MD1 which is the object detection result for the segmented images with numbers #1 and #2 is output to the synthesizing processing unit 8 and the holding unit 6. The holding unit 6 stores the metadata MD1.

Based on the reservation result for the frame with number #4, the selection processing unit 7 outputs each of the latest detection results among the past object detection results (metadata MD1) of the segmented images with numbers #0 and #3 stored in the holding unit 6 to the synthesizing processing unit 8 as the detection results for the frame with number #4, for the segmented images with numbers #0 and #3 for which the object detection processing is not executed for the frame with number #4.

The synthesizing processing unit 8 performs the metadata selection processing on the metadata MD1 of the segmented images with numbers #1 and #2 output from the reliability filter processing unit 43 and the metadata MD1 of the segmented images with numbers #0 and #3 output from the selection processing unit 7. Then, the synthesizing processing unit 8 synthesizes the metadata MD1 after the metadata selection processing with the object detection result (metadata MD2) of the overall processing unit 3 for the frame with number #4, and outputs the metadata MD that is the final object detection result.

Next, based on the reservation result for the frame with number #5 in FIG. 7, the selection processing unit 2 outputs the segmented image with number #1 to the image scaling processing unit 40 corresponding to the arithmetic core with number #0 such that the object detection processing for the segmented image with number #1 is executed by the arithmetic core with number #0 (the object detection processing unit 41 with number #0), the image scaling processing unit 40 corresponding to the arithmetic core, the metadata adjustment processing unit 42, and the reliability filter processing unit 43.

In addition, based on the reservation result for the frame with number #5, the selection processing unit 2 outputs the segmented image with number #0 to the image scaling processing unit 40 corresponding to the arithmetic core with number #1 such that the object detection processing for the segmented image with number #0 is executed by the arithmetic core with number #1 (the object detection processing unit 41 with number #1), the image scaling processing unit 40 corresponding to the arithmetic core, the metadata adjustment processing unit 42, and the reliability filter processing unit 43.

The metadata MD1 which is the object detection result for the segmented images with numbers #1 and #0 is output to the synthesizing processing unit 8 and the holding unit 6.

Based on the reservation result for the frame with number #5, the selection processing unit 7 outputs each of the latest detection results among the past object detection results (metadata MD1) of the segmented images with numbers #2 and #3 stored in the holding unit 6 to the synthesizing processing unit 8 as the detection results for the frame with number #5, for the segmented images with numbers #2 and #3 for which the object detection processing is not executed for the frame with number #5.

The synthesizing processing unit 8 performs the metadata selection processing on the metadata MD1 of the segmented images with numbers #1 and #0 output from the reliability filter processing unit 43 and the metadata MD1 of the segmented images with numbers #2 and #3 output from the selection processing unit 7. Then, the synthesizing processing unit 8 synthesizes the metadata MD1 after the metadata selection processing with the object detection result (metadata MD2) of the overall processing unit 3 for the frame with number #5, and outputs the metadata MD that is the final object detection result.

Similar processing may be performed on subsequent frames.

Next, a flow of processing of the object detecting device of the present example will be described with reference to a flowchart of FIG. 8. First, an input image is input to the object detecting device (step S400 in FIG. 8). For example, an image captured by an external camera (not illustrated) or the like is input to the object detecting device.

The overall processing unit 3 executes overall processing of performing object detection on a whole of the input image (step S401 in FIG. 8).

The allocation processing unit 5 determines a segmented image for each frame which is subject to object detection among the plurality of segmented images in advance at a cycle of N frames, and executes allocation processing of reserving the determined segmented image (step S402 in FIG. 8).

The division unit 1 of the division processing unit 4 divides the input image into a plurality of segmented images (step S403 in FIG. 8).

Based on the determination of the allocation processing unit 5, the selection processing unit 2 outputs a segmented image to be subjected to the object detection processing among all the segmented images of the frame, which are subject to processing, to the image scaling processing unit 40 (step S404 in FIG. 8).

The image scaling processing unit 40, the object detection processing unit 41, the metadata adjustment processing unit 42, and the reliability filter processing unit 43 of the division processing unit 4 execute the object detection processing on the segmented image output from the selection processing unit 2 (step S405 in FIG. 8).

Note that, as is clear from the above description, the allocation processing unit 5 determines allocation of the next cycle. Therefore, the selection processing unit 2, the image scaling processing unit 40, the object detection processing unit 41, the metadata adjustment processing unit 42, and the reliability filter processing unit 43 execute the object detection processing on the segmented image based on the processing result of the overall processing unit 3 in the previous cycle.

The selection processing unit 7 selects past object detection results of the segmented images for which the object detection processing is not executed from among the object detection results stored in the holding unit 6 and outputs the selected results to the synthesizing processing unit 8 (step S406 in FIG. 8).

The synthesizing processing unit 8 performs synthesizing processing of combining the object detection result output from the overall processing unit 3, the object detection result output from the division processing unit 4, and the past object detection result output from the selection processing unit 7 (step S407 in FIG. 8). Then, the synthesizing processing unit 8 outputs the metadata MD which is the final object detection result (step S408 in FIG. 8). The object detecting device performs the above processing of FIG. 8 for each frame of the input image.

Figure 9:
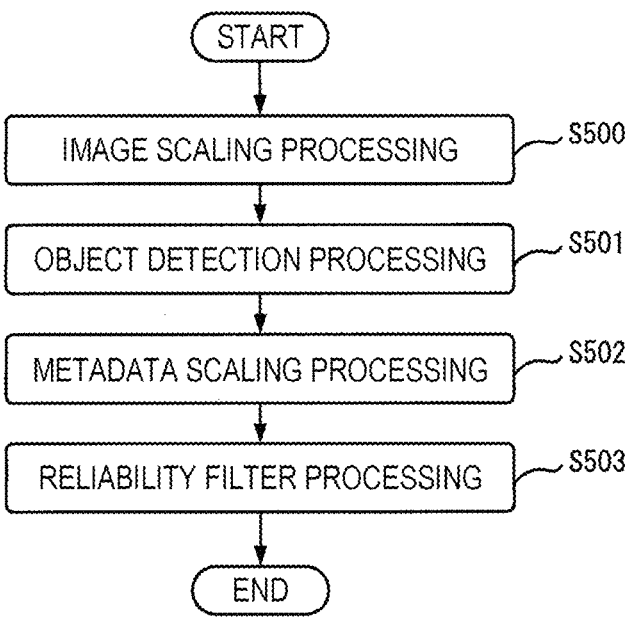
FIG. 9 is a flowchart for explaining details of overall
processing by an overall processing unit according to the
first example of the present invention.

FIG. 9 is a flowchart for explaining details of the overall processing in step S401. The image scaling processing unit 30 of the overall processing unit 3 executes scaling processing on the input image (step S500 in FIG. 9).

The object detection processing unit 31 of the overall processing unit 3 executes object detection processing on a whole of the input image reduced by the image scaling processing unit 30 (step S501 in FIG. 9).

The metadata scaling processing unit 32 of the overall processing unit 3 executes scaling processing of enlarging the BB included in the metadata of the input image generated by the object detection processing unit 31 to correspond to the size of the input image before reduction (step S502 in FIG. 9).

The reliability filter processing unit 33 of the overall processing unit 3 sends the detection result (metadata MD2) of the object of which reliability is equal to or greater than the reliability threshold value Th to the synthesizing processing unit 8, and sends the detection result (metadata MD3) of the object of which reliability is less than the reliability threshold value Th to the allocation processing unit 5 (step S503 in FIG. 9).

Figure 10:
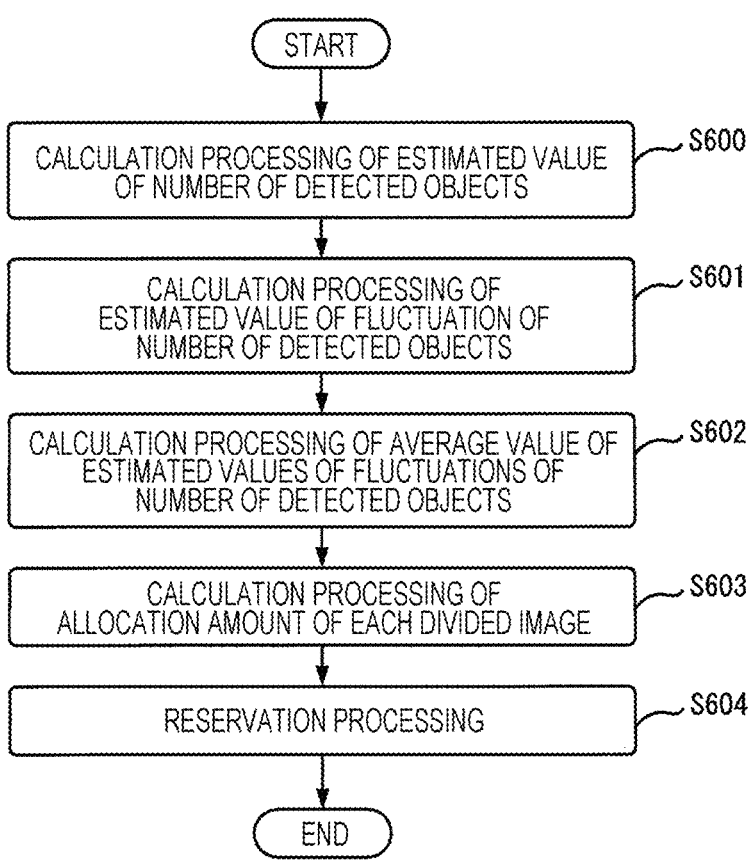
FIG. 10 is a flowchart for explaining details of allocation
processing by an allocation processing unit according to the
first example of the present invention.

FIG. 10 is a flowchart for explaining details of the allocation processing in step S402. The estimated fluctuation calculation unit 50 of the allocation processing unit 5 calculates the estimated value Nobj of the number of detected objects of each segmented image for each frame based on the detection result of the object of which reliability is less than the reliability threshold value Th (step S600 in FIG. 10). Details of this processing are as described in FIG. 3.

The estimated fluctuation calculation unit 50 calculates, for each segmented image, an absolute difference value between the estimated value Nobj of the number of detected objects of each segmented image and the estimated value Nobj of the number of detected objects of each segmented image in the previous frame, thereby calculating an estimated value of a fluctuation between frames of the number of detected objects of each segmented image (step S601 in FIG. 10).

Then, the estimated fluctuation calculation unit 50 calculates the average value $E_{ave}[Im]$ of the estimated values of the fluctuations of the number of detected objects in one cycle for each segmented image (step S602 in FIG. 10).

The segmented image allocation processing unit 51 of the allocation processing unit 5 calculates the allocation amount J[Im] of each segmented image based on the average value $E_{ave}[Im]$ of the estimated values of the fluctuations of the number of detected objects of each segmented image calculated by the estimated fluctuation calculation unit 50 (step S603 in FIG. 10).

The segmented image allocation processing unit 51 reserves the arithmetic cores and the frames for executing the object detection processing for the selection processing units 2 and 7 in order from the segmented image having the larger allocation amount J[Im] (step S207 in FIG. 5). Details of the processing of the segmented image allocation processing unit 51 are as described with reference to FIGS. 5 and 6.

Figure 11:
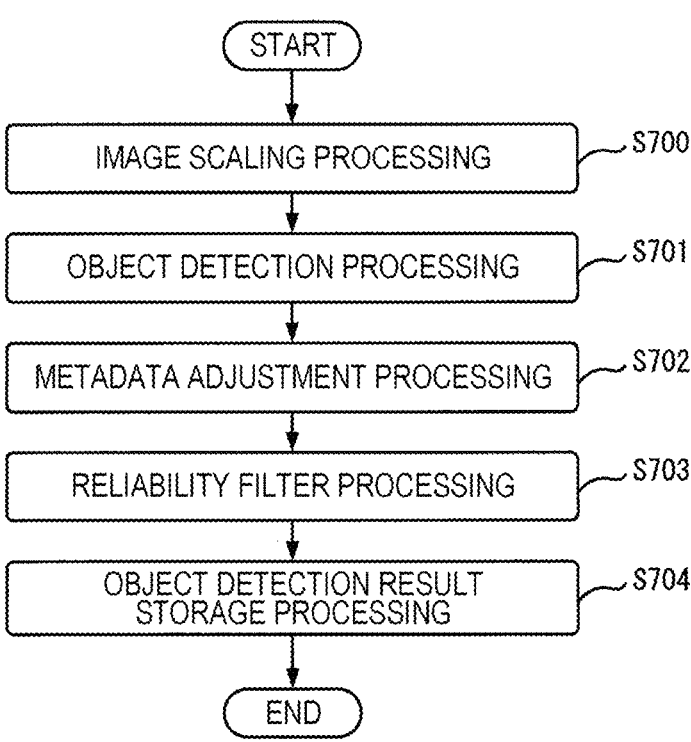
FIG. 11 is a flowchart for explaining details of object
detection processing by a division processing unit according
to the first example of the present invention.

FIG. 11 is a flowchart illustrating details of the object detection processing for the segmented image in step S405.

The image scaling processing unit 40 of the division processing unit 4 executes scaling processing of reducing each of the plurality of segmented images output from the selection processing unit 2 to a designated image size (step S700 in FIG. 11).

The object detection processing unit 41 of the division processing unit 4 executes object detection processing on the segmented image reduced by the image scaling processing unit 40 (step S701 in FIG. 11).

The metadata adjustment processing unit 42 of the division processing unit 4 performs metadata adjustment processing for mapping the BB detected by the object detection processing unit 41 to the input image before the division for each segmented image input to the object detection processing unit 41 (step S702 in FIG. 11).

The reliability filter processing unit 43 of the division processing unit 4 outputs the detection result (metadata MD1) of the object having the reliability equal to or greater than the reliability threshold value Th among the detection results after the metadata is adjusted by the metadata adjustment processing unit 42 to the synthesizing processing unit 8 and the holding unit 6 (step S703 in FIG. 11).

The holding unit 6 stores the metadata MD1 output from the reliability filter processing unit 43 (step S704 in FIG. 11).

Figure 12:
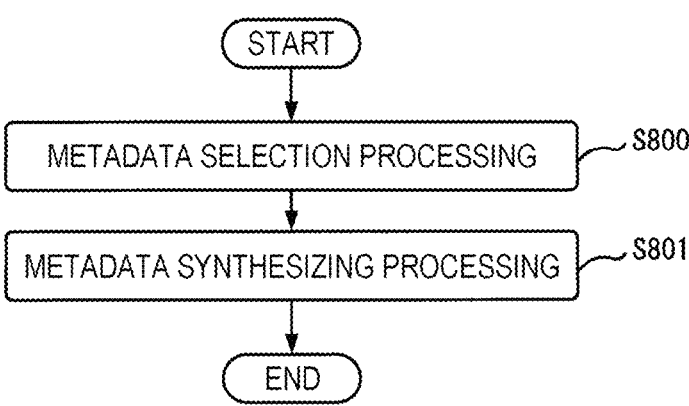
FIG. 12 is a flowchart for explaining details of synthe-
sizing processing by a synthesizing processing unit accord-
ing to the first example of the present invention.

FIG. 12 is a flowchart for explaining details of the synthesizing processing in steps S407 and S408. The synthesizing processing unit 8 executes metadata selection processing on the object detection result (metadata MD1) output from the division processing unit 4 and the object detection result (metadata MD1) output from the selection processing unit 7 (step S800 in FIG. 12).

Here, the flow of the metadata selection processing in step S800 will be described in more detail with reference to the flowchart in FIG. 13.

Figure 13:
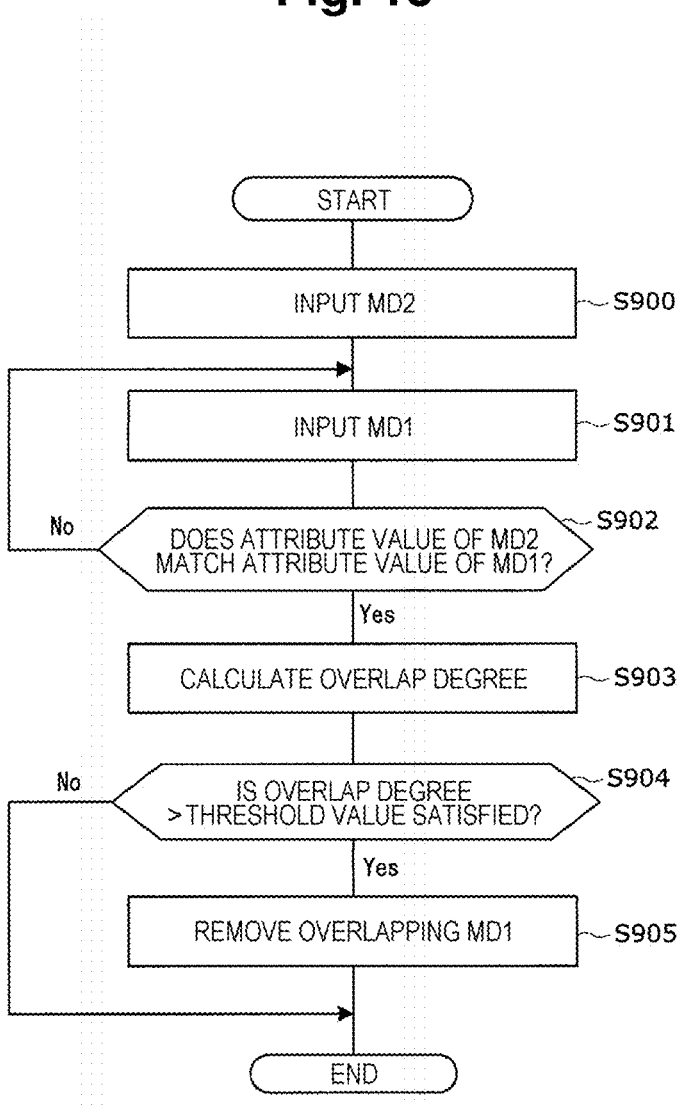
FIG. 13 is a flowchart for explaining details of metadata
selection processing by the synthesizing processing unit
according to the first example of the present invention.

First, the object detection result (metadata MD2) output from the overall processing unit 3 is input to the synthesizing processing unit 8 (step S900 in FIG. 13). In addition, the object detection result (metadata MD1) output from the division processing unit 4 and the object detection result (metadata MD1) output from the selection processing unit 7 are input to the synthesizing processing unit 8 (step S901 in FIG. 13).

Next, the synthesizing processing unit 8 determines whether or not the attribute value of the metadata MD2 of the whole of the image matches the attribute value of the metadata MD1 of the segmented image (step S902 in FIG. 13). The synthesizing processing unit 8 calculates an overlap degree between the metadata MD2 and the metadata MD1 having an attribute value that matches the attribute value of the metadata MD2 (step S903 in FIG. 13). Specifically, the synthesizing processing unit 8 sets a value obtained by dividing the area of overlap between the BB included in the metadata MD2 and the BB included in the metadata MD1 by the area of the BB included in the metadata MD1 as the overlap degree.

In addition, when the attribute value included in the metadata MD2 of the whole of the image does not match the attribute value included in the metadata MD1 of the segmented image in step S902 (No in step S902), processing is performed on another piece of attribute information included in the metadata MD1 of the same segmented image.

Then, in a case where the overlap degree Calculated in step S903 exceeds a preset threshold value (Yes in step S904 in FIG. 13), the synthesizing processing unit 8 determines that the attribute information of the metadata MD1 of the segmented image and the attribute information of the metadata MD2 of the whole of the image are the same attribute information, and removes the same attribute information from the metadata MD1 (step S905 in FIG. 13). That is, the attribute information of the metadata in which the attribute values of the objects detected in the segmented image and the whole of the image are the same and the objects are in the corresponding positional relationship in the input image is excluded from the metadata MD1 of the segmented image.

On the other hand, when the overlap degree is equal to or less than the threshold value (No in step S904), the processing ends. In this manner, the synthesizing processing unit 8 executes the metadata selection processing of FIG. 13 for each of the plurality of segmented images.

Next, the synthesizing processing unit 8 synthesizes the metadata MD1 after the metadata selection processing and the metadata MD2 of the whole of the image, and outputs the metadata MD that is a final object detection result (step S801 in FIG. 12).

As described above, in the present example, it is possible to reduce the calculation amount while suppressing the occurrence of missing of object detection.

In the present example, as a result of the allocation, the detection result of the segmented image that is unselected in a certain frame is set as the past detection result stored in the holding unit 6. On the other hand, as another example, the motion vector value of the object in each segmented image may be calculated for each frame, and the past detection result for the unselected segmented image may be corrected with the calculated motion vector value (the center coordinates of the BB in the past detection result may be corrected with the motion vector value).

Second Example

Figure 14:
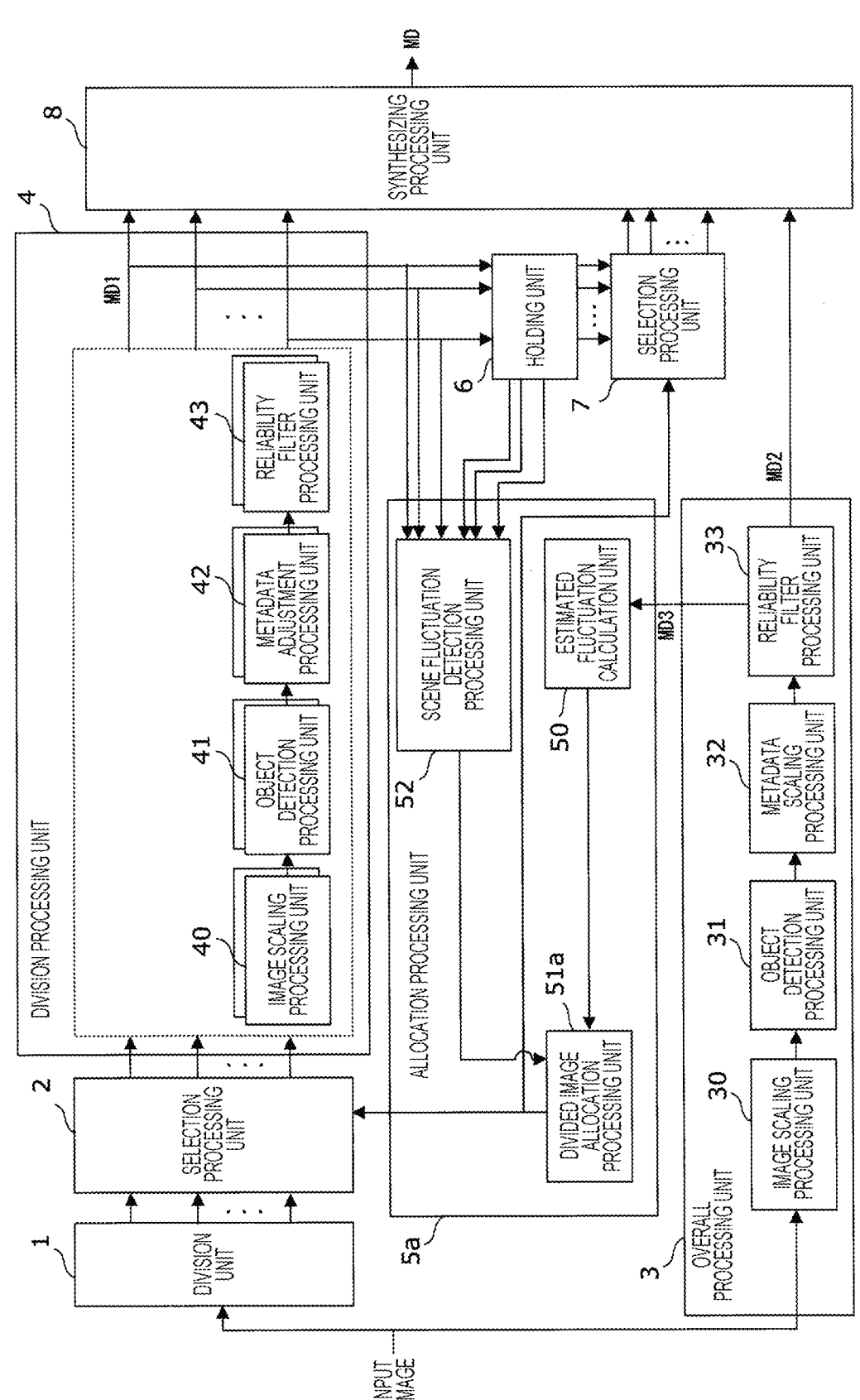
FIG. 14 is a block diagram illustrating a configuration of
an object detecting device according to a second example of
the present invention.

Next, a second example of the present invention will be described. FIG. 14 is a block diagram illustrating a configuration of an object detecting device according to the second example of the present invention. The object detecting device of the present example includes the division unit 1, the selection processing unit 2, the overall processing unit 3, the division processing unit 4, an allocation processing unit 5a, the holding unit 6, the selection processing unit 7, and the synthesizing processing unit 8.

The division unit 1, the selection processing units 2 and 7, the overall processing unit 3, the division processing unit 4, the holding unit 6, and the synthesizing processing unit 8 are as described in the first example.

The allocation processing unit 5a of the present example includes the estimated fluctuation calculation unit 50, a segmented image allocation processing unit 51a, and a scene fluctuation detection processing unit 52.

The object detecting device of the present example performs the object detection processing similarly to the first example, but is different from the first example in that the reserved arithmetic core and frame are canceled and returned to the initial state in a case where the input image suddenly changes within the cycle. For this processing, in the present example, the scene fluctuation detection processing unit 52 is provided in the allocation processing unit 5a.

Figure 15:
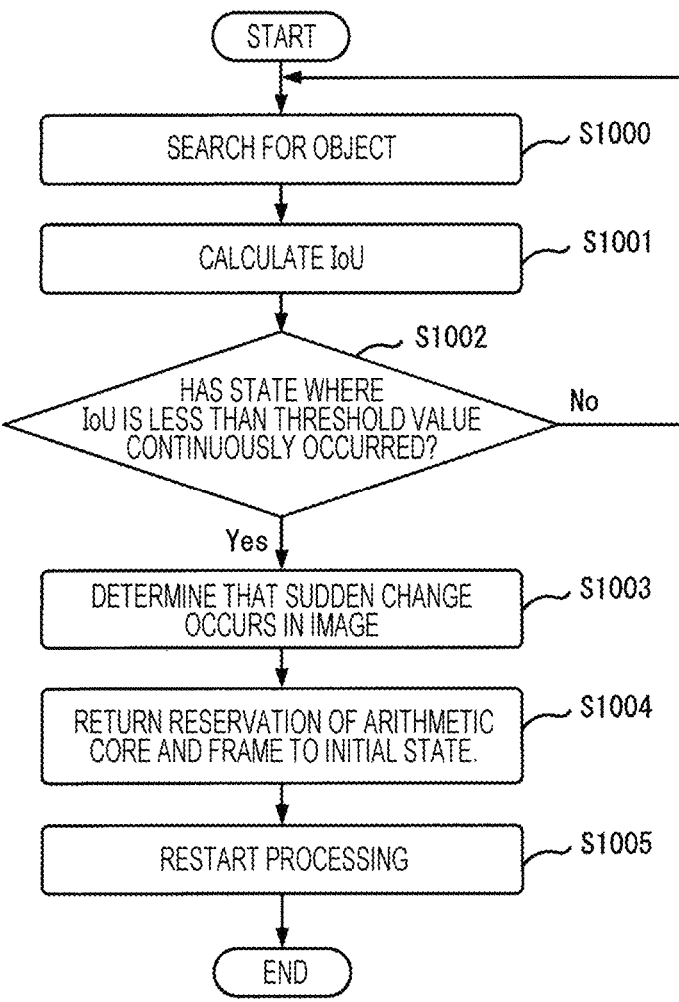
FIG. 15 is a flowchart for explaining an operation of a
scene fluctuation detection processing unit according to the
second example of the present invention.

FIG. 15 is a flowchart for explaining the operation of the scene fluctuation detection processing unit 52. The scene fluctuation detection processing unit 52 searches for an object having the same attribute value as the object included in the latest detection result output from the division processing unit 4, from the past detection results stored in the holding unit 6 (step S1000 in FIG. 15).

Then, the scene fluctuation detection processing unit 52 calculates intersection over union (IoU) of objects having the same attribute value included in the latest detection result and the past detection result (step S1001 in FIG. 15). IoU is a value obtained by dividing a common area between the BB region of the object included in the latest detection result and the BB region of the object included in the past detection result by a sum set of the BB region of the object included in the latest detection result and the BB region of the object included in the past detection result. The scene fluctuation detection processing unit 52 calculates such IoU for each object having the same attribute value.

The scene fluctuation detection processing unit 52 determines whether a state where the average value of IoU calculated for each object is less than a predetermined threshold value B has continuously occurred for y frames (y is an integer of 2 or more determined in advance) (step S1002 in FIG. 15). The scene fluctuation detection processing unit 52 makes such a determination for each frame.

When the state where the average value of IoU is less than the threshold value β occurs continuously for γ frames (Yes in step S1002), the scene fluctuation detection processing unit 52 determines that a sudden change has occurred in the input image, and notifies the segmented image allocation processing unit 51a of the determination result (step S1003 in FIG. 15).

The segmented image allocation processing unit 51a that has received the notification from the scene fluctuation detection processing unit 52 cancels all the reservation of the arithmetic cores and the frames performed on the selection processing units 2 and 7 and returns to the initial state (no reservation) (step S1004 in FIG. 15). Then, the segmented image allocation processing unit 51a resets the frame in which the determination result indicates that a sudden change has occurred in the input image as the start point of the cycle (for example, in the example of FIG. 4, the frames with numbers #0, #4, and #8), and resumes the processing of FIG. 10 (step S1005 of FIG. 15). Other configurations are as described in the first example.

Figure 16:
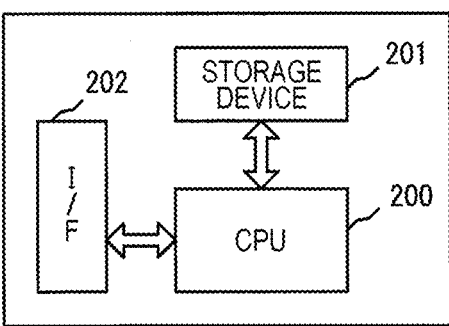
FIG. 16 is a block diagram illustrating a configuration
example of a computer that realizes the object detecting
devices according to the first and the second examples of the
present invention.
Figure 17:
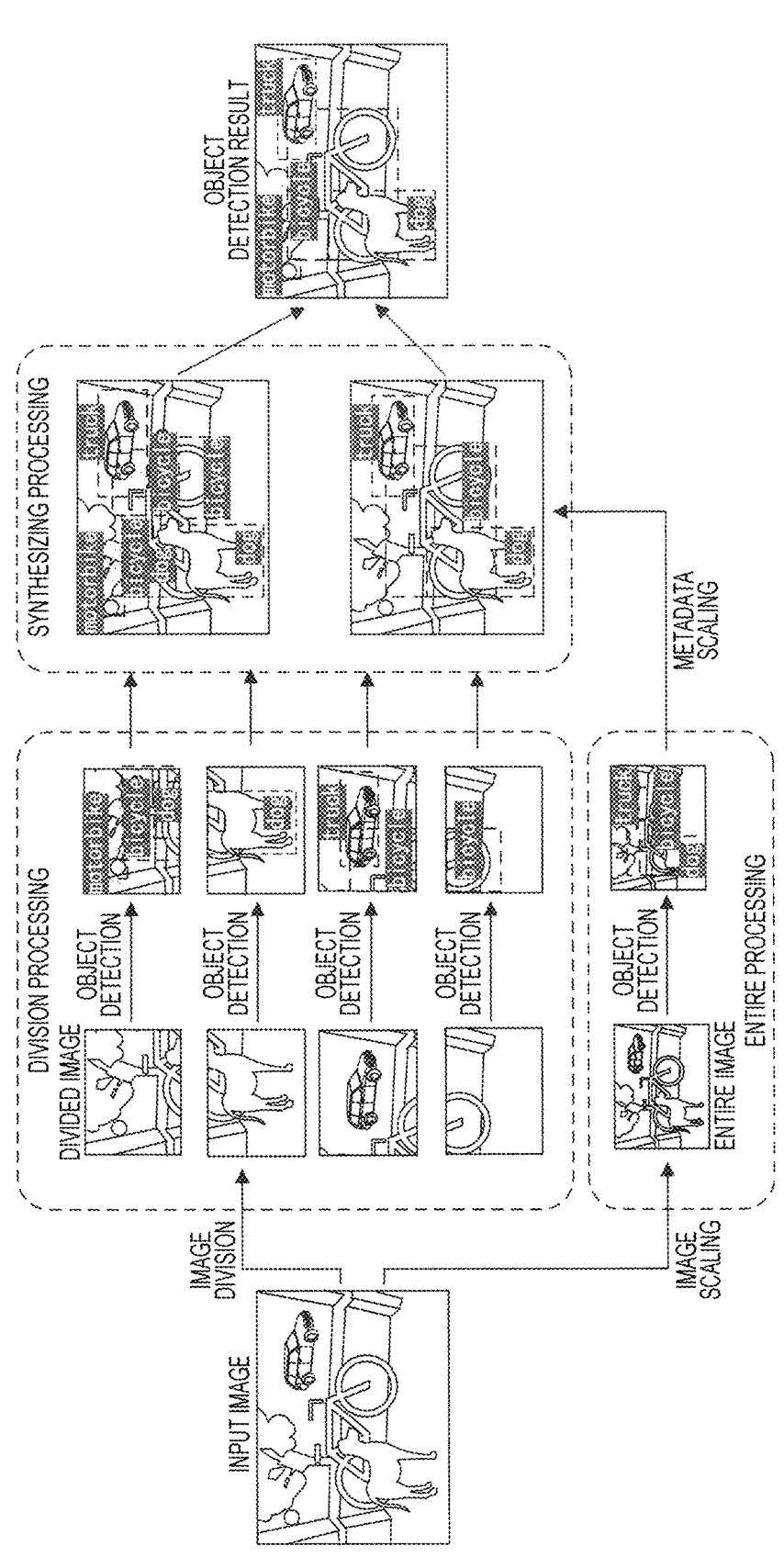
FIG. 17 is a view for explaining a conventional object
detection method.

The object detecting device described in the first and second examples can be realized by a computer including a central processing unit (CPU), a storage device, and an interface and a program for controlling those hardware resources. A configuration example of the computer is illustrated in FIG. 16. The computer includes a CPU 200, a storage device 201, and an interface device (I/F) 202. The CPU 200 includes a plurality of arithmetic cores.

For example, a camera or the like is connected to the I/F 202. In such a computer, a program for realizing the object detection method of embodiments of the present invention is stored in the storage device 201. The CPU 200 executes the processing described in the first and second examples according to the program stored in the storage device 201.

INDUSTRIAL APPLICABILITY

Embodiments of the present invention can be applied to an image processing technology.

REFERENCE SIGNS LIST

1 Division unit
2 Selection processing unit

3 Overall processing unit
4 Division processing unit
5, 5a Allocation processing unit
6 Holding unit
7 Selection processing unit
8 Synthesizing processing unit
30 Image scaling processing unit
31 Object detection processing unit
32 Metadata scaling processing unit
33 Reliability filter processing unit
40 Image scaling processing unit
41 Object detection processing unit
42 Metadata adjustment processing unit
43 Reliability filter processing unit
50 Estimated fluctuation calculation unit
51, 51a Segmented image allocation processing unit
52 Scene fluctuation detection processing unit

The invention claimed is:

1. An object detecting device comprising:
one or more processors; and
a non-transitory storage device storing a program to be executed by the one or more processors, the program including instructions to:
  divide an input image into a plurality of segmented images;
  perform object detection processing on a reduced image obtained by scaling a whole of the input image for each frame of the input image to obtain an overall object detection result;
  determine a first segmented image for each frame of one or more frames which is subject to object detection among the plurality of segmented images in advance in a cycle of N frames, wherein N is an integer equal to or greater than a total number of segmented images, and reserve the first segmented image to obtain a reservation result;
  select and output, for each frame of the one or more frames, one or more selected segmented images that are subject to object detection among the plurality of segmented images based on the reservation result;
  perform object detection processing on each of one or more selected segmented images to obtain a division object detection result; and
  obtain a final object detection result by synthesizing the overall object detection result and the division object detection result,
wherein the instructions to determine a segmented image for each frame of the plurality of segmented images which is subject to object detection among the plurality of segmented images in advance in the cycle of N frames comprises instructions to:
  calculate an estimated value of a quantity of detected objects for each of the plurality of segmented images for each frame of the one or more frames based on the overall object detection result;
  calculate an estimated value of a fluctuation between frames of the quantity of detected objects for each of the plurality of segmented images based on an absolute difference value between the frames of the estimated value;
  calculate an average value of estimated values of fluctuations of the quantity of detected objects within the cycle for each of the plurality of segmented images; and
  reserve a segmented image for each frame which is subject to object detection in a next cycle such that a quantity of times object detection is executed is proportionally distributed to each segmented image based on an average value of estimated values of fluctuations of the quantity of detected objects for each segmented image.

2. The object detecting device according to claim 1, wherein the instructions include further instructions to:

after determining that all segmented images are selected for object detection at least M times in a next cycle, wherein M is an integer of 1 or more, determine a segmented image for each frame which is subject to object detection in the next cycle such that the number of times object detection is executed is proportionally distributed to each segmented image based on an average value of estimated values of fluctuations of the number of detected objects for each of the segmented images for the remaining allocable frames.

3. The object detecting device according to claim 2, wherein the instructions include further instructions to:

calculate the estimated value of the quantity of detected objects for each of the plurality of segmented images by aggregating a quantity of detected objects of which reliability calculated is less than a threshold value and equal to or greater than a threshold value/$\alpha$ for each segmented image in which the object is positioned, within an object group detected in the overall object detection result, wherein $\alpha$ is a real number of 2 or more.

4. The object detecting device according to claim 2, wherein the instructions include further instructions to:

store the division object detection result; and select and output, for each frame of the one or more frames, a past object detection result for a second segmented image for which object detection is not executed based on the reservation result, wherein the overall object detection result, the division object detection result, and the past object detection result output for each frame of the one or more frames to obtain the final object detection result.

5. The object detecting device according to claim 2, wherein the instructions include further instructions to:

determine whether the input image has changed based on a latest object detection result and a past object detection result; and cancel and returns the reservation to an initial state when it is determined that the input image has changed.

6. The object detecting device according to claim 1, wherein the instructions include further instructions to:

calculate the estimated value of the quantity of detected objects for each of the plurality of segmented images by aggregating a quantity of detected objects of which reliability calculated is less than a threshold value and equal to or greater than a threshold value/$\alpha$ for each segmented image in which the object is positioned, within an object group detected in the overall object detection result, wherein $\alpha$ is a real number of 2 or more.

7. The object detecting device according to claim 1, wherein the instructions include further instructions to:

store the division object detection result; and select and output, for each frame of the one or more frames, a past object detection result for a second segmented image for which object detection is not executed based on the reservation result, wherein the overall object detection result, the division object detection result, and the past object detection result output for each frame of the one or more frames to obtain the final object detection result.

8. The object detecting device according to claim 1, wherein the instructions include further instructions to:

determine whether the input image has changed based on a latest object detection result and a past object detection result; and cancel and return the reservation to an initial state when it is determined that the input image has changed.

9. An object detection method comprising:

a first step of dividing an input image into a plurality of segmented images;

a second step of performing object detection processing on a reduced image obtained by scaling a whole of the input image for each frame of one or more frames;

a third step of determining a segmented image for each frame of the one or more frames which is subject to object detection among the plurality of segmented images in advance in a cycle of N frames, wherein N is an integer equal to or greater than a total number of segmented images, and reserving the segmented image;

a fourth step of selecting and outputting, for each frame, one or more first segmented images that are subject to object detection among the plurality of segmented images based on a reservation result from the third step;

a fifth step of performing object detection processing on each of the one or more first segmented images output in the fourth step; and a sixth step of obtaining a final object detection result by synthesizing, for each frame, an object detection result from the second step and an object detection result from the fifth step, wherein the third step comprises:

calculate an estimated value of a quantity of detected objects for each of the plurality of segmented images for each frame of the one or more frames based on the object detection result from the second step;

calculate an estimated value of a fluctuation between frames of the quantity of detected objects for each of the plurality of segmented images based on an absolute difference value between the frames of the estimated value;

calculate an average value of estimated values of fluctuations of the quantity of detected objects within the cycle for each of the plurality of segmented images; and reserve a segmented image for each frame which is subject to object detection in a next cycle such that a quantity of times object detection is executed is proportionally distributed to each segmented image based on an average value of estimated values of fluctuations of the quantity of detected objects for each segmented image.

10. The object detecting method according to claim 9, further comprising:

a seventh step of after determining that all segmented images are selected for object detection at least M times in a next cycle, wherein M is an integer of 1 or more, determining a segmented image for each frame which is subject to object detection in the next cycle such that the number of times object detection is executed is proportionally distributed to each segmented image based on an average value of estimated values of fluctuations of the number of detected objects for each of the segmented images for the remaining allocable frames.

11. An object detecting device comprising:

one or more processors; and a non-transitory storage device storing a program to be executed by the one or more processors, the program including instructions to:

divide an input image into a plurality of segmented images;

perform object detection processing on a reduced image obtained by scaling a whole of the input image for each frame of the input image to obtain an overall object detection result;

determine a first segmented image for each frame of one or more frames which is subject to object detection among the plurality of segmented images in advance in a cycle of N frames, wherein N is an integer equal to or greater than a total number of segmented images, and reserve the first segmented image to obtain a reservation result;

select and output, for each frame of the one or more frames, one or more selected segmented images that are subject to object detection among the plurality of segmented images based on the reservation result;

perform object detection processing on each of one or more selected segmented images to obtain a division object detection result;

store the division object detection result;

select and output, for each frame of the one or more frames, a past object detection result for a second segmented image for which object detection is not executed based on the reservation result among the plurality of segmented images; and obtain a final object detection result by synthesizing the overall object detection result, the division object detection result, and the past object detection result output for each frame of the one or more frames.

\* \* \* \* \*